US012229190B2

(12) United States Patent
Collins

(10) Patent No.: US 12,229,190 B2
(45) Date of Patent: Feb. 18, 2025

(54) MACHINE FOR ANALYSIS OF ENTITY RESOLUTION DATA GRAPHS USING PEER DATA STRUCTURES

(71) Applicant: LiveRamp, Inc., San Francisco, CA (US)

(72) Inventor: W. Dwayne Collins, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/020,109

(22) PCT Filed: Apr. 29, 2021

(86) PCT No.: PCT/US2021/029960
§ 371 (c)(1),
(2) Date: Feb. 7, 2023

(87) PCT Pub. No.: WO2022/035477
PCT Pub. Date: Feb. 17, 2022

(65) Prior Publication Data
US 2023/0259557 A1    Aug. 17, 2023

Related U.S. Application Data

(60) Provisional application No. 63/109,183, filed on Nov. 3, 2020, provisional application No. 63/070,911, filed on Aug. 27, 2020, provisional application No. 63/063,791, filed on Aug. 10, 2020.

(51) Int. Cl.
*G06F 16/901* (2019.01)
(52) U.S. Cl.
CPC .............................. *G06F 16/9024* (2019.01)

(58) Field of Classification Search
CPC .................................................. G06F 16/9024
See application file for complete search history.

(56) References Cited

U.S. PATENT DOCUMENTS

| 9,251,470 | B2 | 2/2016 | Hua et al. |
| 9,275,114 | B2 | 3/2016 | Milton et al. |
| 9,311,301 | B1 | 4/2016 | Balluru et al. |
| 9,348,891 | B2 | 5/2016 | Srivastava et al. |
| 9,659,052 | B1 | 5/2017 | Glennon et al. |

(Continued)

OTHER PUBLICATIONS

Yin, Xiaoxin et al., "Semi-Supervised Truth Discovery," WWW 2011-Session:Trust and Diversity (2011).

(Continued)

*Primary Examiner* — Diedra McQuitery
*Assistant Examiner* — Samuel C Sharpless, III

(57) ABSTRACT

A machine analyzes an entity resolution data graph using a curated peer review set of data structures. The machine uses independent peer data structures that model similar or related yet different universes and entities. These data structures may include other entity resolution data graphs or file-based data structures. The machine first performs candidate screening to determine which of these data structures meet the requirements for use in the analysis. The machine then selects from among the candidate peer data structures with which to perform the analysis. Finally, the entity resolution data graph is analyzed using queries against the selected peer data structures to provide an analysis of the quality of its data graph.

19 Claims, 8 Drawing Sheets

(56) References Cited

U.S. PATENT DOCUMENTS

| | | |
|---|---|---|
| 9,794,358 B1 | 10/2017 | Jurgens |
| 10,078,679 B1 | 9/2018 | Shefferman et al. |
| 2012/0278297 A1 | 11/2012 | Yin et al. |
| 2017/0142140 A1 | 5/2017 | Muddu et al. |
| 2019/0236082 A1* | 8/2019 | Salmanson ........... G06F 16/313 |
| 2019/0278777 A1* | 9/2019 | Malik ................. G06F 16/9024 |

OTHER PUBLICATIONS

Deng, Yang et al., "MedTruth: A Semi-Supervised Approach to Discovering Knowledge Condition Information from Multi-Source Medical Data," arXiv:1809.10404v2 (Aug. 19, 2019).

Fang, Xiu Susie et al., "Value Veracity Estimation for Multi-Truth Objects via a Graph-Based Approach," IW3C2 Companion (Apr. 3-7, 2017).

Li, Yaliang et al., "A Survey on Truth Discovery," arXiv:1505.02463v2 (Nov. 4, 2015).

Pasternack, Jeff et al., Knowing What to Believe (When You Already Know Something), Procs. of the 23rd Int'l Conf. on Computational Linguistics (coling 2010) (Aug. 2010).

1 Supplementary European Search Report for Application No. 21856377.3 (dated Oct. 24, 2024).

\* cited by examiner

MACHINE FOR ANALYSIS OF ENTITY RESOLUTION DATA GRAPHS USING PEER DATA STRUCTURES

CROSS-REFERENCE TO RELATED APPLICATIONS

This application claims priority to US provisional patent application no. 63/063,791, filed Aug. 10, 2020; U.S. provisional patent application No. 63/070,911, filed Aug. 27, 2020; and U.S. provisional patent application No. 63/109,183, filed Nov. 3, 2020. Each of the foregoing applications are incorporated by reference as if set forth herein in their entirety.

BACKGROUND OF THE INVENTION

An entity resolution data graph is a complex data structure for housing data pertaining to a defined, existing universe of entities, along with an external interface to the users of the data graph. In identity applications, these "entities" may include names, postal addresses, other touchpoint-type data such as telephone numbers and email addresses, and one or more types of "households" (defined here as groups of individual persons with some unifying socio-economic relationship). Data graphs contain "asserted relationships" (or ARs) that consist of a set of data and the connections between such data, where the connected data each pertain to a particular entity. Thus a data graph's principle units are asserted relationships (ARs) of touchpoint-type instances and other attributes whose intent is to describe a unique entity (such as a person, household, or a transaction that involves one or more persons or households) that form the basis for the model of a particular universe. A universe may be, for example, the consumers resident in a given geographical or political entity. The connections between these instances, formed into asserted relationships, define the complete entity resolution data graph. In one such example, an asserted relationship may be a connection between the name, postal address, email address, and telephone number for an individual person. The external interface of the data graph may be provided for various purposes. For example, the entity resolution data graph may be used for matching against a set of customer records maintained by a retailer, or for authentication of identifying data entered as part of a financial transaction.

Different entity resolution data graphs reflect differences in the makeup of the data of interest to those who build those entity resolution data graphs. Examples of such universes include the US census, which is used for demographic purposes; the Internal Revenue Service, which is used for tax collection and assessment purposes; and medical care provider systems, which are used for providing and tracking patient care. Because each of these data graphs are built for different purposes, they include different sorts of data and prioritize data differently. They may also differ in their internal structure in order to more efficiently operate within their associated field. Different entity resolution data graphs also reflect differences in the definition or context of each entity represented within the system. Here as well, this may reflect differences in the scope and intent for the particular entity resolution data graph under consideration.

Because no two such entity resolution data graphs are likely to be the same in terms of the dimensions presented above, there can be no objective notion of "truth" or "accuracy" for such systems. For example, when natural persons provide information as part of a transaction that is used to construct or update an entity resolution data graph, those persons may make assertions about their personal information in a variety of contexts. These may also obfuscate or use different "authentication strings" for different contexts. A person may use aliases, may use old information, may make up information or use false information, and other means to intentionally or unintentionally create errors or ambiguity. Because the person is the ultimate source of this information, there can be no objective truth that can be derived from any other source. It is thus impossible to build a system that provides a single measure of objective accuracy for any entity resolution data graph.

Despite the difficulty in measuring accuracy and the impossibility of finding objective truth with respect to an entity resolution data graph, there is nevertheless a strong need to analytically assess the quality of these data structures, both in terms of the data they contain and the connections between that data in the form of asserted relationships. The lack of any such quality measure in the existing technical art impedes the building of effective entity resolution data graphs, and further impedes the improvement of existing entity resolution data graphs. Therefore, a machine that provided a quantifiable analysis of an entity resolution data graph would be highly desirable.

References mentioned in this background section are not admitted to be prior art with respect to the present invention.

BRIEF SUMMARY OF THE INVENTION

The present invention is directed to a machine and method for analyzing an entity resolution data graph using peer data structures. Because the machine uses peer data structures as the basis for the analysis, the measurement is independent of any bias or subjective perspective imposed by the entity resolution data graph that is being evaluated.

In various embodiments, the machine may provide an analysis that is expressive both from a point-in-time and a temporal perspective using a curated peer-review framework of corresponding data structures. The machine analyzes the accuracy of the subject entity representation data graph using independent data structures that model similar or related yet nevertheless different universes and entities. These independent data structures are referred to herein as "peers" of the subject entity resolution data graph and facilitate an analysis that functions analogously to a peer review system in other fields. These independent data structures may have more localized and specific data and connections between data within the data structures because they, in certain embodiments, may not be full entity resolution data graphs themselves. In many cases, it is not practical to use full entity resolution data graphs as peers because such systems are generally not publicly available. Therefore, the peer data structures may represent universes of smaller size and scope than that of a full entity resolution data graph, and in particular as that of the subject entity resolution data graph. Thus rather than directly comparing each independent data structure to the subject full entity resolution data graph from the subject full entity resolution data graph's biased perspective, based on its own internal structure that reflects the purpose for which it was created, the machine of the present invention provides the means to impart specific, unbiased analysis comparing the subject entity resolution data graph and the selected peer data structures using context-neutral data queries. Each of the independent data structures will populate responses to these queries using data sets from their own independent data and authoritative perspective. Also, as each independent data structure can provide variability from the others in nontrivial ways, the analysis components in certain embodiments do not focus on fine-level details of individual entity instances (e.g., common names and phone numbers), but rather focus on an aggregate perspective from a very granular level of contextual similarity. However, if any direct internal instance level analytical comparisons may be required—such as whether the independent data structure contains a specific predefined entity— such a query will be based on each independent data structures perspective, not that of the subject entity representation data graph being evaluated. In other words, each independent data structure determines if and how that data structure is represented in its own universe and then employs that representation to evaluate the subject full entity resolution data graph. The results of this analysis for each specific independent data structure are then collected to generate quality measures for the subject entity resolution data graph.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
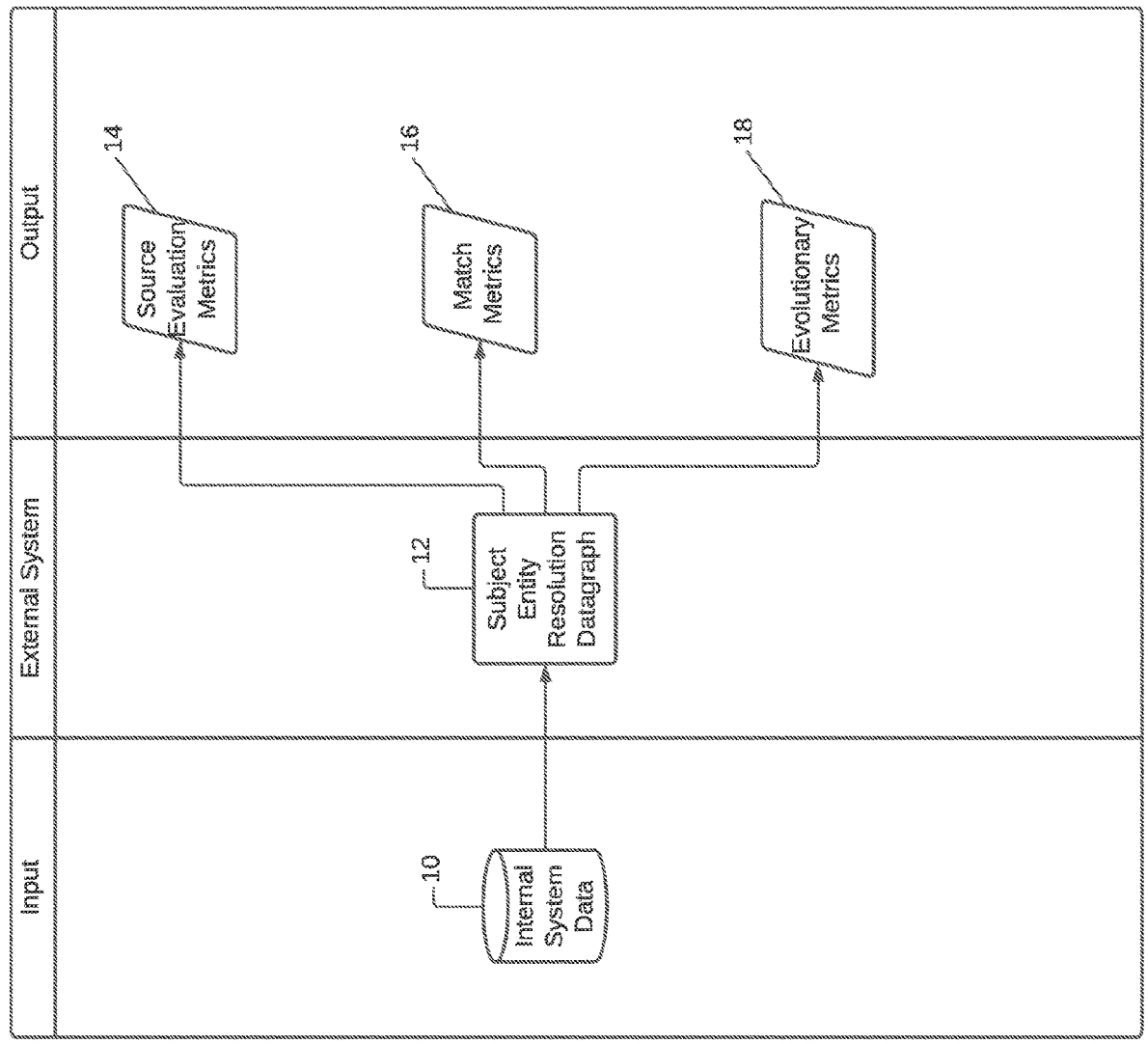
FIG. 1 is a swim lane chart illustrating the candidate screening step for entity resolution data graph potential peer data structures according to an embodiment of the invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In certain embodiments, the invention is directed to a machine to analyze a subject entity resolution data graph by means of independent peer systems that model similar or related yet nevertheless different universes and entities. These independent systems are referred to as peers of the entity resolution data graph. Alternatively, the peers may also be referred to herein as "oracles," in that they may be used to answer specific questions about information in the subject entity resolution data graph if they are chosen as peers during the candidate screening process as described below.

There are basically two different types of independent systems that may be used in various embodiments of the invention as potential peer independent systems. One type is a file-based data structure (FB system) which contains the data graph for an existing authentication system. Such instances are primarily databases of records pertaining to specific persons of interest for a business or company, which primarily contain a single asserted relationship (AR) for each included person. From the description of these various data structures provided above, it will be seen that these file-based data structures are not full entity resolution data graphs. The second type of potential peer independent system is an actual entity resolution data graph, but in this case the entity resolution data graph cannot be shared. This may be, for example, on account of privacy concerns or legal restrictions. As one non-limiting example, the owner of the independent peer entity resolution data graph may have collected the data populating the graph under a privacy policy that would not allow full sharing of the data contained in that independent entity resolution data graph. The independent entity resolution data graph may, however, be used in order to access its matching or linking service. In addition, it may be used in order to generate a set of aggregated, automonized distributions and counts that do not reveal personally identifiable information (PII), the release of which would not violate the applicable privacy policy. This system thus may nevertheless be used to measure the consistency and trustworthiness of the underlying entity resolution data graph using the machine described herein. In practice, it has been found that there are generally fewer independent entity resolution data graphs available for use in the set of peers than file-based data structures, and thus it is anticipated that the system will primarily rely on the latter for analysis of the subject entity resolution data graph.

As entity resolution data graphs are applicable to a wide range of use cases, the data that feeds into the subject entity resolution data graph may come from widely varied sources. Persons often alter their asserted personally identifiable information from one context to another. For example, a person may represent himself or herself at a website offering coupons in a less formal manner than with respect to asserted information for opening a bank account or applying for a home loan. The degree of these variations, as well as typographical errors and intentional obfuscations of personally identifiable information, is difficult to identify and correct; as a result, many entity resolution systems use a data graph whose number of entities that model the universe of interest is far greater than the actual size of the corresponding universe. This occurs because the system was not able to resolve different names, nicknames, and aliases, for example, into the single person associated with all of these different identifiers. In such cases the data graph can be subdivided into regions where the roles are quite different for resolution. These include regions of entities that are outdated yet are kept for historical completeness; regions of the most sought-after entities by the owners of the entity resolution data graph, and the like. The machine as described with respect to embodiments of the present invention can be used to analysis any subset of regions in the subject entity resolution data graph, and hence the quality of different regions of the subject entity resolution data graph can be compared to each other from the same independent perspective provided by the independent peer data structures.

At the highest level, the machine described herein performs three steps in order to analyze the subject entity resolution data graph. In the first step, candidate screening, the machine performs a calculation of the trustworthiness and contextual relevance of each candidate independent data structure. In the second step, peer selection, the output of the first step is used to the selection of the initial set of independent data structures to be used for the peer review. In the third step, subject analysis, the actual peer review analysis is performed with respect to the subject entity resolution data graph using the selected peer data structures. Each of these components are described in detail below.

The first step, candidate screening, serves the purpose of identifying those initial independent data structures (either file-based data structures or entity resolution data graphs) that meet the trustworthiness and relevance criteria from which to build the peer data structure set to be used by the machine. This process is more contextually involved than that generally used to determine the value, quality, or trustworthiness of a candidate source file for inclusion into an existing entity resolution data graph. This is due to the fact that each independent data structure must exhibit consistency, believability, and expressiveness in both its defining asserted relationships and entity assertions as an independent standalone system, with a bare minimum of biased interpretation from the subject entity resolution data graph presented for evaluation. In order to identify meaningful independent data structures, an analysis of the candidates is performed relative to two different major cognitive aspects. First, the machine will evaluate the degree of consistency, believability, and trustworthiness of the data that makes up the model of the universe of interest contained in the candidate data structure. Second, the machine will measure the degree of relevance of that universe of interest and entities that make up the corresponding data model to those of the subject entity resolution data graph presented for evaluation.

As the classical notions of "truth" and "accuracy" are not knowable or measurable for entity resolution data graphs, the minimal degree and context of trust that should be given to an independent peer data structure is heuristically measured by its internal data consistency as well as the general believability of the data that defines the candidate independent data structure in terms of the entities it asserts to represent. In the example of a data structure pertaining to individuals, the information to be collected may include distributions and counts for attributes of the asserted name components, postal addresses, phone numbers, gender, date of births, emails, and the like, as well as consistency measurements between sets of these attributes. However, additional contextual information may also be computed by the machine in various embodiments, depending on the provided entity types and attributes. This additional information may include (but is not restricted to) person entity data, household entity data, and additional asserted touchpoint or attribute information. Personal entity data may include the number of differences in the person entity information per independent data structure update period, including counts of removed persons, new persons, and distributions of new and removed touchpoint-type instances per person. The distributions may be made per each touchpoint type individually or per all touchpoint types in aggregate (i.e., a tuple of each type as a key value). If there are multiple names per person, the distributions of instances of such names with no shared name component and with at least one different name component may be included in person entity data.

Household entity data may include the distribution of the number of person entities per asserted household; the distribution of the distinct person last names within each household; the distribution of the counts of the distinct postal addresses for each household keyed on the number of asserted persons in the household; the distribution of the counts of the distinct phone numbers for each household keyed on the number of asserted persons in the household; the distribution of the number of households asserting each phone number; the distribution of the number of households asserting each email address; the distribution of the number of households asserting each postal address; and the number of changes in the household entity information per independent system update period at a person level. These changes per update period may include new households, removed households, combined households, and split households. A split household represents the decision to lump together data from what was formerly believed to be two separate households, whereas a split household represents the decision to split apart data that was formerly believed to be a single household into two separate households.

Additional asserted touchpoint/attribute information may include distributions of counts of Internet protocol (IP) addresses per asserted person; distributions of counts of IP addresses per asserted household; distributions of counts of the number of persons asserting each person level identifier (e.g., driver's license ID, customer ID, person ID); and distributions of age ranges for each person in a common household.

Referring now to FIG. 1, the process performed by the machine for candidate screening, i.e., the evaluation of believability or trustworthiness, for a candidate entity resolution data graph may be described. Internal system data 10 contains information provided by or extracted from the candidate entity resolution data graph itself. In some cases, subject entity resolution data graph 12, which as previously noted in the entity resolution data graph for which analysis is being provided by the machine, may provide distribution metrics to help answer questions about believability or trustworthiness of the candidate entity resolution data graph. But in other cases, a subset of the data represented in FIG. 1 as internal system data 10 may be sent to subject entity resolution data graph 12 in order to derive these metrics.

The output from candidate screening for the candidate entity representation data graph may include three different classes of metrics in certain embodiments. Source evaluation metrics 14 may include the evaluation of various particular touchpoint metrics, such as postal city/state/ZIP consistency. Match metrics 16 is a measure of how much the candidate system is similar to or dissimilar to the subject entity resolution data graph 12 that is to be evaluated. This is thus a measure of context relevancy. Evolutionary metrics 18 measures changes over time. The queries then are directed to whether the changes over time seem reasonable and match known external sources of very high reliability, such as the National Change of Address database or other US Postal Service data.

These distributions and counts are computed by the machine and recorded in an output file or files as shown in the "output" lane of FIG. 1. The machine computes those single point-in-time distributions and counts that are based at a person level. For the household level point-in-time information computation, then if the data is person based and provides a household ID for each person record, the machine aggregates the data based on the household ID and then computes the distributions and counts, while treating each household as a person using the person level process noted previously. These requested distributions can vary due to the eventual agreement to use the candidate entity resolution data graph, because not all such desired metrics may be provided by the candidate. Again, this relates to limitations on the use of existing entity resolution data graphs. In this case the system will address this issue within the context of the measurement of contextual relevance described below.

Figure 2:
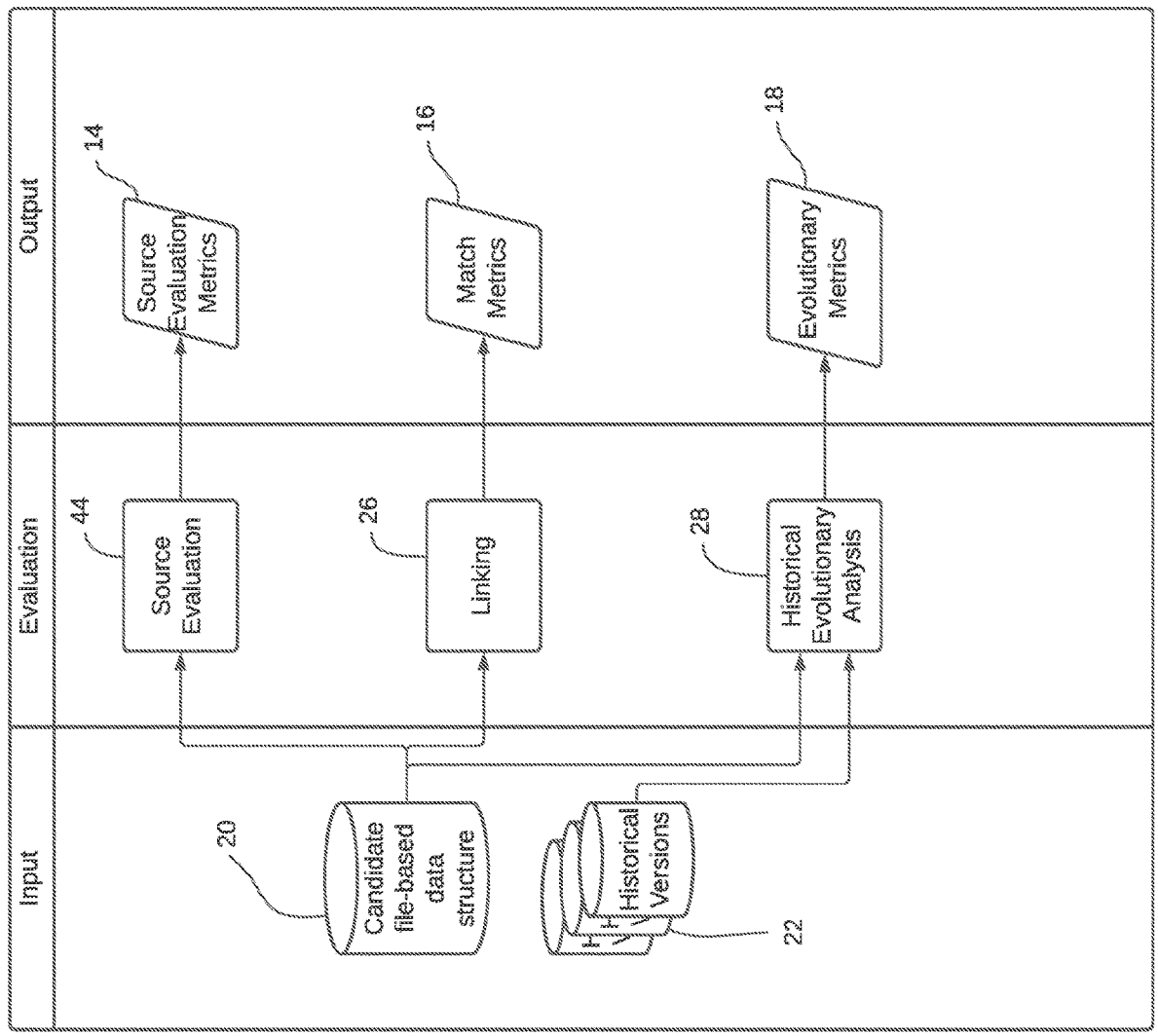
FIG. 2 is a swim lane chart illustrating the candidate screening step for file-based potential peer data structures according to an embodiment of the invention.

For the candidate file-based data structures, these distributions and counts are also automatically calculated by the machine and recorded in an output file. FIG. 2 provides an overview of the inquiry concerning believability or trustworthiness in the case of file-based data structures. The machine requests a set of distributions and counts from the candidate file-based data structure, from which the same metrics can be computed and estimated as described above in reference to FIG. 1. Both the current version of the potential file-based data structure 20 and one or more historical versions 22 may be employed. Key metrics for evaluation of potential file-based data structure 20 are generated at source evaluation process 44. Another evaluation approach is to perform linking against the records in potential file-based data structure 22, as represented at linking process 26. In linking process 26, the machine uses the subject entity resolution data graph to identify a particular entity by returning a link corresponding to that entity. The "link" may be any identifier, such as a number or alphanumeric string. The link is unique among the universe of all such links for entities of this type, and thus unambiguously is associated with a particular entity represented in the subject entity resolution data graph. In one example, the machine measures at linking process 26 how well candidate file-based data structure 20 performs when being applied against the subject entity resolution data graph's linking process. In addition, the machine applies historical evolutionary analysis process 28 against both candidate file-based data structure 20 and historical versions 22 in order to determine how much candidate file-based data structure 20 has changed over time. The same metrics are computed as with the candidate entity resolution data graph of FIG. 1, and recorded in an output file as source evaluation metrics 14, match metrics 16, and evolutionary metrics 16.

The functions performed by the machine in this first main step may be explained in greater detail as follows. Utilizing the systems described above, for each pair A, B of the data graphs where A temporally precedes B, the set intersection (common entries) and the two set differences A-B (removed persons) and B-A (new persons) are computed. It is important to note that all of the pairings are computed rather than just the pairs of consecutive data graphs. These types of temporal changes may reflect actual and persisted changes in the subject entity resolution data graph, but also such data can and does have unexpected and unintentional highly localized noise. Such noise can happen by the unintentional actual addition or removal of a person or by fluctuations in the assignment of an identifier to a given person. So if the computed differences from data graph A to data graph B as well as those from data graph B to data graph C are larger than the computed differences from A to C then B apparently contained such localized "noise." Hence the computations of all of the pairings provide a more expressive and easily identifiable temporal pattern of the evolution of the candidate independent system's person entities.

For the temporal behavior of the different touchpoint type instances (postal address, phone number, email, etc.) for each person, both the touchpoint specific and aggregate distributions are realized in a single computed distribution. The system follows the framework just discussed, in that for each associated pair of data graphs, the persons common to both graphs (intersection) are compared in terms of the asserted touchpoint types. For each such person a comparison tuple for each of the touchpoint types is computed of the form (#touchpoint type instances in the "first" data graph, #not in the second graph, #new instances in the second graph). For the person these single instance comparison tuples are collected in a single distribution key tuple, and the counts of persons sharing the same distribution key form the final distribution. For example, if postal address, phone, and email are the touchpoint types of interest (in that order) the distribution entry ((2,0,0), (2,1,0), (1,0,1)): 9562194 indicates that there are slightly over 9.5 million common persons in the two data graphs that had two postal addresses, two phones, and one email address in the first graph and there was no change in asserted postal addresses, one phone instance removed and one new email instance in the second graph. Just as there can be localized noise in the person entities of the candidate independent system such noise can (and often does) exist at the touchpoint type instance level as well. Hence, such noise can be identified with these distributions in the same way as described for person entities themselves.

Relative to the believability and trustworthiness of the temporal aspects of the household entities for a candidate file-based data structure, the different data graphs' households are represented by the aggregate set of person identifiers that share a common household identifier. As with the computed person level temporal changes, the counts for the number of households that stayed the same, disappeared, are new, increased or decreased in terms of the constituent persons, split into two or more different households or combined with other households will be computed based on the evolutionary patterns of the person identifiers.

In order to assess the contextual relevance of the candidate independent system, each candidate file-based data structure person entity data is passed through the subject entity resolution data graph's existing match and linking service to estimate the overlap of the two modeled universes in terms of the attributes of the person entities and shared PII that define the base level entities (names, postal addresses, phone numbers, email addresses, etc.). Depending on the framework of the entity resolution data graph match service, the candidate independent system's individual person level data may need to be passed into the match service as a set of different inputs rather than a single full record input. In one implementation of this invention, the subject entity resolution data graph matches a full input record in terms of each embedded entity representation (name+single touchpoint type instance) in the full person record. In this case the match service returns a "maintained" link for each entity representation if there is a person in the entity resolution data graph containing that entity representation and a "derived" link otherwise. Hence each full person record input returns a list of links. The set of postal address ER links for all input persons are aggregated and counted in terms of whether the returned link is either maintained or derived, and this process is done separately for the phone and email entity resolution links as well. These counts indicate the overlap between the candidate independent system and subject entity resolution data graph in terms of each touchpoint type. From this set of links for each person input it is determined whether the input person is associated with one or more persons in the entity resolution data graph or in fact appears to be distinctly different from the persons in the entity resolution data graph.

It should be noted that the set of full persons that are in the entity resolution data graph is often smaller than the aggregate set of persons from the touchpoint-type perspective. The distribution of counts of the number of associated entity resolution data graph persons is first computed. From this information a second distribution is also computed, which goes in the "opposite" direction as it counts the number of input persons from the candidate independent system that appear to be associated with the same one or two persons in the entity resolution data graph. These two distributions express the degree of the under-consolidations and over-consolidations of persons in the candidate independent system relative to the perspective of the entity resolution data graph. These last two distributions are computed by means of the natural extension described earlier for the process just described to estimate the under-consolidations and over-consolidations for the asserted households.

Unlike the previously described metrics, these last two distributions are used to normalize the independent system's review of the subject entity resolution data graph (if chosen to be used) for a more direct and expressive comparison in the evaluation. For example, if it is determined that 50% of the person entities in the independent system are in fact two or more distinct persons, then the distributions and counts will be normalized correspondingly to give a better person estimate.

For the entity resolution data graph candidates a similar but reverse process is used to approximate the different quality and contextual information that is provided by the candidate. A file of curated person ARs from the entity resolution data graph being assessed is passed through the candidate's match/linking service in order to address both any believability questions not directly responded to by the entity resolution data graph candidate and estimate the contextual relevance of the candidate to the entity resolution data graph being evaluated. This curated file is constructed to provide almost complete coverage at both a person and household level for one or more dense populations in several localized geographic areas that form a reasonable proxy for the universe of the entity resolution data graph. In one implementation of this component the curated file consists of all persons and households residing in South Carolina or have at least one asserted South Carolina postal address.

As noted earlier, the structure of the input to the candidate entity resolution data graph independent system's match service will depend on the framework of the linking output. For the most expressive interpretation of the linking results, the returned match results will provide both touchpoint level and full person level information. Relative to the touchpoint level match results, the associated information for each touchpoint type of the persons in the entity resolution data graph that returned a maintained link from the entity resolution data graph candidate independent system is collected. Any believability issues that are directly related to that specific touchpoint type are then estimated by the entity resolution data graph' information. The entity resolution data graph person information is collected for the full person input level interpretation as described above and forms a proxy for the associated entity resolution data graph candidate independent system's universe. From this set any additional needed believability metrics as well as the universe level contextual relevance of the candidate independent system to the entity resolution data graph being evaluated is estimated, and the associated same normalizing interpolation values are computed. The results of this analysis for each candidate independent system is stored in an appropriate data structure for review before the second component of the invention is applied.

There is no hard threshold as to an expected degree of commonality of these constituents, but rather the computed similarity will impact the types of expressive quality-based assessments that the independent system can expect to provide as well as the context that must be used to interpret the assessment results. Hence a candidate independent system that has little to no direct overlap with the system being evaluated in terms of phone numbers but exhibits meaningful similarity relative to other entities and contexts can still speak authoritatively and meaningfully about similar and different types and distributions of, for example, phone number area codes per person. On the other hand, a candidate independent system that has little to no commonality relative to all of the important PII components that are used in the system being assessed can only provide very general aggregate information whose expressiveness and value in the assessment process is significantly weakened.

Once this information is collected, it is reviewed to determine the degree of commonality and comparative meaning between the entities if the candidate independent system and the system to be evaluated. For example, quite often the notion of "person" in such candidate independent systems is in fact an internal notion of "customer" or "member", where each may in fact be multiple "persons" or a single representation of a person who forms multiple "customers." As has been noted earlier, there are different definitions of meaningful "households" (some are primarily person based and others are primarily touchpoint-type locality based, i.e., an addressable television ID or IP address). Principle commonalities and differences are estimated in order to determine if there is a defensible interpolative mapping between the candidate independent system and the entity resolution data graph system to be assessed. In some cases it may require a different interpolation normalization for the "person" aspects of the assessment than what is needed for the household aspects. If such interpolations are appropriate, the specifics of the mapping is encoded in order to be used as input into the assessment component of the system.

From this assessment of the initial set of candidate independent systems the second major component of the invention is performed. Not all of the acceptable independent systems may be used as there can be budgetary and computing environment restrictions that limit the constituency of the set of the acceptable independent systems that will be with sufficient differences and commonalities to provide a wide range of quality assessment dimensions from similar but distinct perspectives. Also, during the evolution of the assessment system, changes in the ensemble will be determined and updated using this computed information and evaluative process.

To determine an optimal set of acceptable independent systems that both meets the deployment restrictions and provides maximum expressiveness, an evolutionary analysis framework is used that accepts multiple collections of sets of ARs. In this case, it uses the ARs that represent each of the candidate independent systems to be considered. In addition, it uses one or more sequential orderings of the sets, where each set is labeled as an "insert" one. For each of the orderings a sandbox universe is constructed from the first set in the ordering as the base one. Then each subsequent set of ARs in the list is added to the constructed universe and the changes to the universe are recorded (new persons, consolidations and/or splits of existing persons, new touchpoint types, no changes, etc.). To use this framework the sets of ARs must first be computed. For the file-based data structures the data file itself is used. For the entity resolution data graph independent systems, as described earlier, a curated set of ARs from the entity resolution data graph being evaluated are passed through the entity resolution data graph independent system's match service and for those persons that the service responds as being in its data graph the corresponding input AR will be added to a set that represents the entity resolution data graph independent system.

Figure 3:
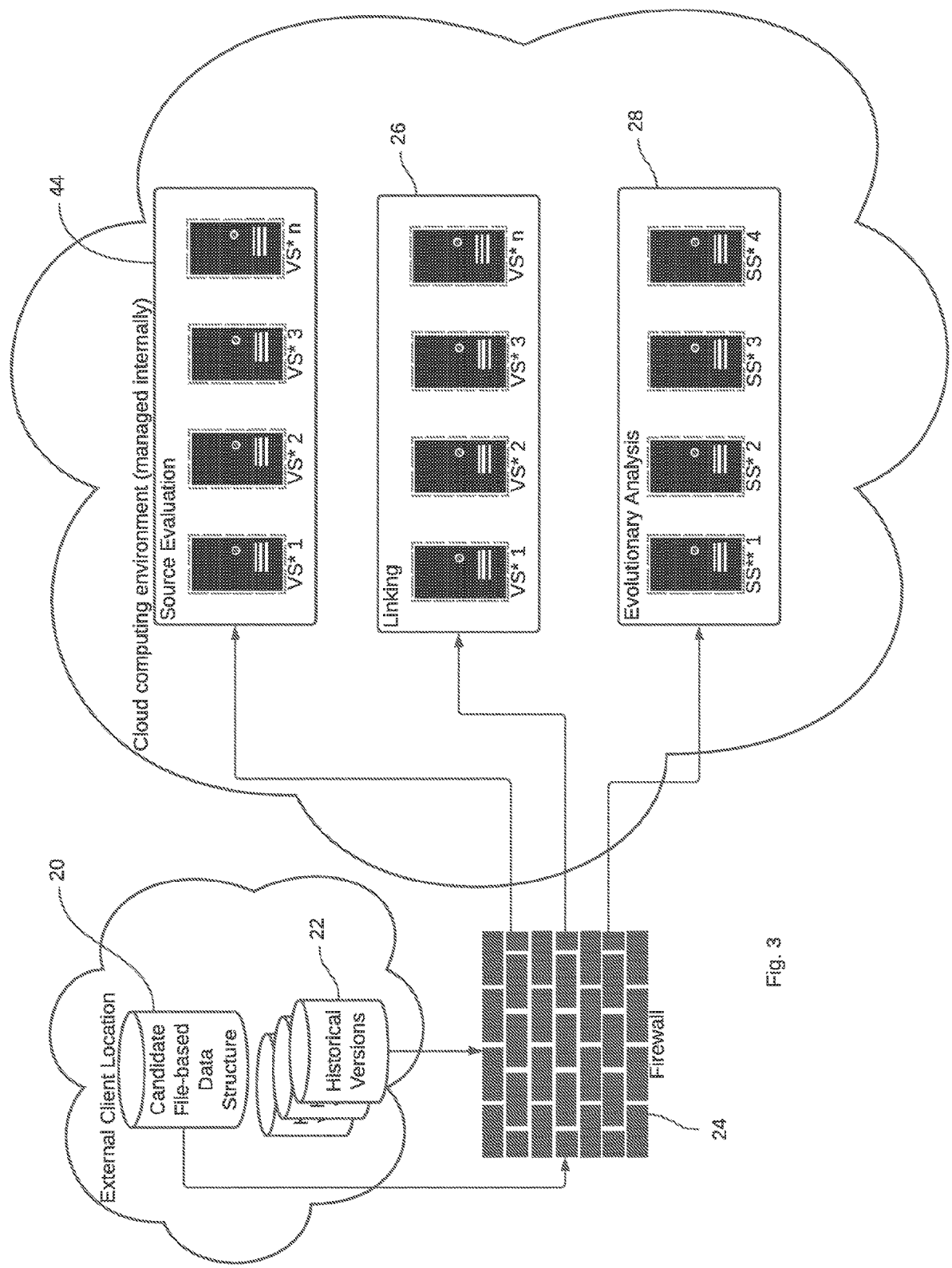
FIG. 3 is an illustration of the logical architecture of a machine to perform the candidate screening step for file-based potential peer review data structures according to an embodiment of the invention.

Referring now to FIG. 3, a hardware configuration for implementation of the candidate testing step using the machine may be described with respect to the candidate file-based data structure analysis of FIG. 2. The temporal-based changes require the comparison between consecutive published updates. For the person level temporal changes, two or more temporally consecutive data (or a dense, geographically localized and representative sample of the data) are loaded into a distributed Apache Spark "in memory" environment. Apache Spark is an open-source unified analytics engine for large scale data processing, providing an interface for programming entire clusters with implicit data parallelism and fault tolerance. Candidate file-based data structure 20 and historical versions 22 are physically remote from the system, at an external client location. They are connected to the system through firewall 24. The hardware for implementing source evaluation process 44 in the machine may be a compute environment consisting of 10s to 100s of cloud computing virtual servers, each with 8 to 64 separate processors and 100s of GB of RAM. The hardware for linking process 26 in the machine may similarly be a compute environment consisting of 10s to 100s of cloud computing virtual servers, each with 8 to 64 separate processors and 100s of GB of RAM. The hardware for implementing historical evolutionary analysis process 28 in the machine may be a compute environment consisting of a Spark environment using 10s to 100s of servers, each with 8 to 64 separate processors and 100s of GB of RAM. Other environments could be employed in alternative embodiments.

Figure 4:
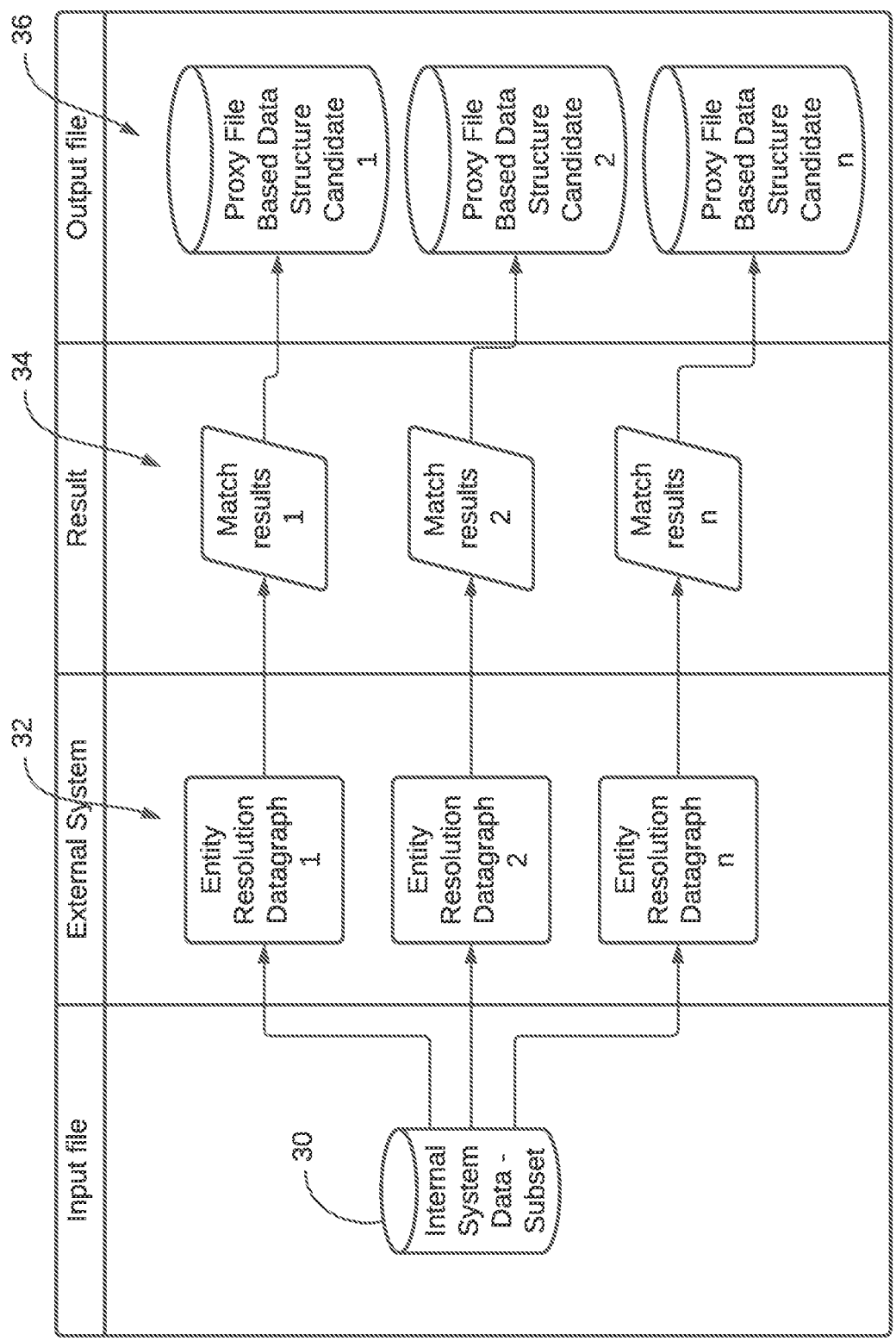
FIG. 4 is a swim lane chart illustrating the peer selection pre-step for entity resolution data graph potential peer data structures according to an embodiment of the invention.

FIG. 4 shows, in overview, the pre-processing steps necessary when an entity resolution data graph (as opposed to a file-based data structure) is to be submitted to the peer processing main step of the method implemented by the machine described herein. Starting with internal system data subset 30, which is a subset of the data from internal system data 10, a number of external entity representation data graphs 32 are employed to generate a set of match results 34. Essentially, each of these are requests to each of the external entity representation data graphs 32 to perform linking (i.e., returning a link associated with an entity) using data from internal system data subset 30 to build the query. The result is, for each of the external entity representation data graphs 32, a proxy file-based data structure candidate 36. This preprocessing is thus used to equate the entity resolution data graph processing to the same level as a file-based data structure processing step. After this pre-processing step, the candidate entity resolution data graph has essentially been transformed into a candidate file-based data structure, so that further processing for either type of data structure as a peer for the subject entity resolution data graph may be handled similarly.

Figure 5:
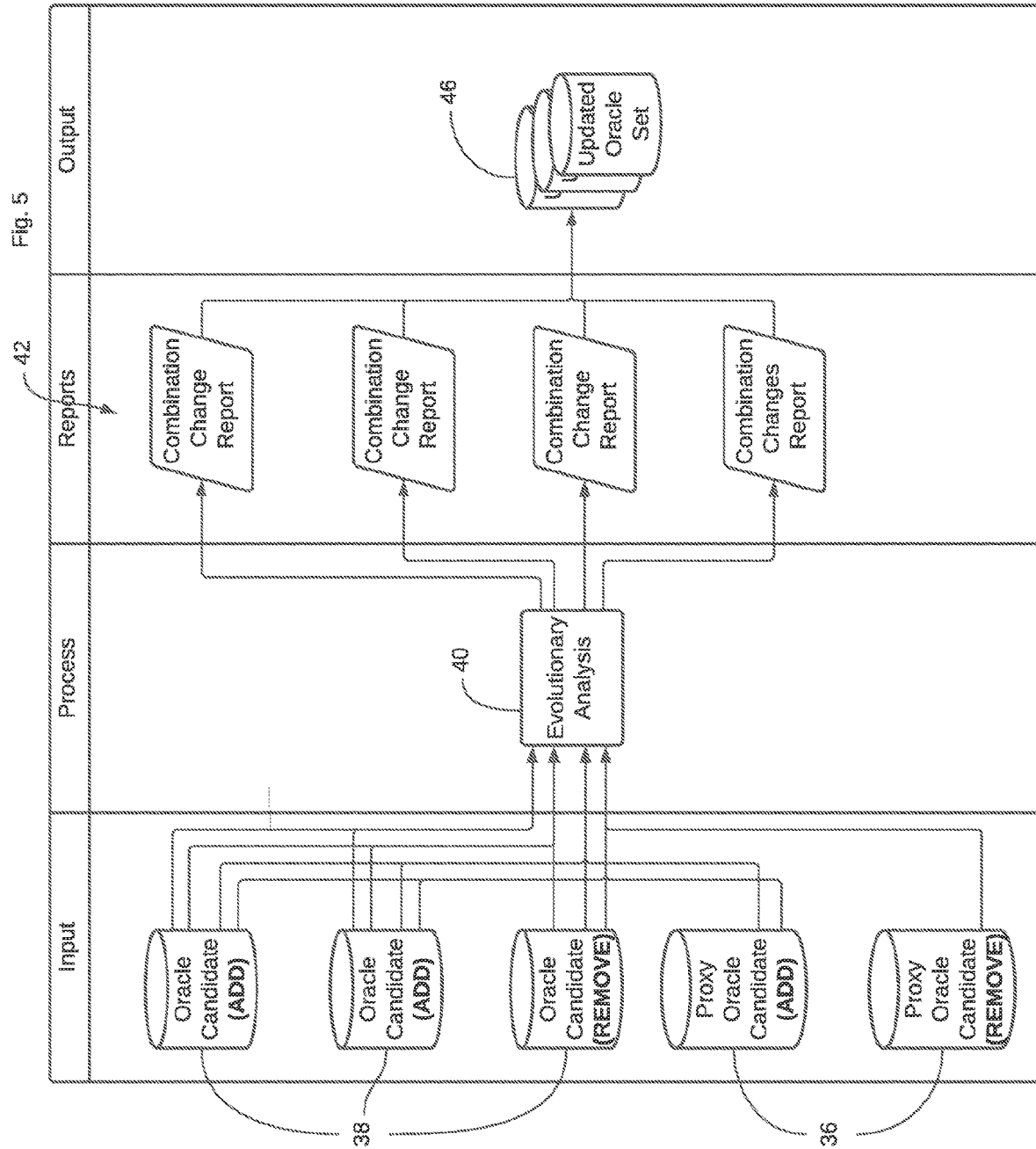
FIG. 5 is a swim lane chart illustrating a peer selection step according to an embodiment of the present invention.

Moving then to FIG. 5, the second main step of the process carried out by the machine—peer selection—may begin. The file-based data structure candidates or "oracle" candidates 38 are given as input, along with the proxy file-based data structure "oracle" candidates 36 that resulted from the process illustrated in FIG. 4, having been constructed from entity resolution data graphs. Both sets of oracle candidates 36 and 38 are then used as input to evolutionary analysis step 40. Each possible combination of candidate and proxy candidate is sent to evolutionary analysis step 40. The output is a series of combination change reports 42. The result then is updated set 46. The operation of this evolutionary analysis step 40 is explained following, with additional information set forth in U.S. provisional patent application No. 63/070,911, filed on Aug. 27, 2020.

Evolutionary analysis process 40 begins with construction of one or more "sandboxes" to be used for the analysis of the specified data sources. These sandboxes allow for all of the various possible combinations of data sources to be examined in order to inform later analysis. If only one sandbox is to be used in a particular implementation, then the corresponding geolocation is identified. For example, if the data to be interpreted has coverage throughout the US, the choice for the geolocation should strive to include as many normalized cultural, socioeconomic, and ethnic diversity primary patterns as the full US.

In order to construct a dense subset of expected persons for the geolocation, the sandbox should contain all PII records for each person that is included. The chosen persons are selected from those that the subject entity resolution data graph indicates has recent evidence that the person has strong associations with the geolocation. One type of association is a postal tie to the geolocation such as the fact that a household containing the person has an address within the geolocation. Another type is a digital one where at least one of the person's phone numbers has an area code associated with the geolocation and has evidence of recent use/activity. Once the sandbox is constructed, the associated resulting data graph for the subset is saved and represents the initial baseline from which a sequence of adjustments are made by adding in or removing additional data files.

Next, evolutionary analysis process 40 takes as input the subject entity resolution data graph and either the set of candidate data sources to be added or the set of candidate data sources to be removed. This process then uses the person formation process for the full reference entity resolution data graph to construct persons from the graph with the input modifications. In the case of the addition of a set of data files, all of the data is added to the sandbox. This is necessary as some of the new data may reflect different geolocational information for a person in the sandbox. In case of the removal of a set of data, only those PII records that were contributed to the baseline graph by only this set will be removed from the sandbox. Once the sandbox data has been modified, the same process to construct the full data graph is used to form persons from the sandbox. Then, once persons are formed, persistent identifiers (links) are computed for both the persons formed and the PII records by a modified process of the full graph linking process. Persistence in this context means that any PII record or person that did not change during the person formation process will continue to have the same identifier that was used in the baseline, and any new PII record gets a new unique identifier as well as a newly formed person whose defining PII comes exclusively from new data. In the case that input data graph persons are changed only by the introduction of new PII records, the baseline identifier is persisted. In the case that persons in the input data graph are merged together, a person in the graph breaks into multiple different persons, or persons in the graph lose some of their defining PII records, the assignment of the identifiers is made on minimizing the changes visible when using the match service on external data. This computation requires the assessment of the recency and match requests for each of the involved PII records. For example, for the case that a person is split into different persons, the original person identifier is assigned to the new person whose data is most recent and has the most match hits for the defining PII records. Once the new persons are formed and the identifiers are assigned in a persistent manner, this modified sandbox data is saved. If additional modifications are needed, this data can be used as input to this component in an iterative fashion.

Next, evolutionary analysis process 40 takes the set of all data sets from the oracle candidates constructed in the desired modification sequence and computes the differences between any pair of the data sets. The pairings of the consecutive data sets relative to the linear ordering of the construction from the previous component is the default, but any pair of data sets can be compared by this component. The differences computed to describe the evolutionary impact of the data express the fundamental changes of the data structure due to the modification. One such change is the creation of new persons from new data (which occurs only if new data is added). This difference indicates that some of the data provided by the newly added sources is distinctly different than that present in the reference entity resolution data graph. However, as the input data is restricted to a specific geolocation, only those new persons who have postal, digital, or other touchpoint instances that directly tie them to this geolocation is meaningful. A second change is the complete deletion of all of the existing PII records for a person in the reference entity resolution data graph. This can happen when the modification is the removal of a set of data sources, and if it does occur each instance is meaningful relative to the evolution of the data set. Continuing, one or more persons in the reference entity resolution data graph can combine into a single person either with the deletion or addition of data sources. This behavior (a consolidation) is meaningful to the evolution of the data set as no matter how the consolidation occurred the impact is on persons in the reference entity resolution data graph. The same is true for splits, i.e., the breaking of a single person into two or more different persons.

To this point the stated differences have been with respect to the actual person formations, but an additional general evolutionary effect that is captured is in terms of whether the actual PII records and corresponding persons have confirmatory data sources. Every PII record that has only one contributing source is a "point of failure" record in the data set as the removal of that contributing source can cause a significant change in the resulting data graph. Hence when a set of data sources is removed from the graph it is important to identify those PII records which did not disappear but rather became such "point of failure" records. Moving from the level of PII records to persons (i.e., disjoint sets of PII records), if the deletion of a set of data sources creates a person such that every defining PII record for that person is a "point of failure" record then the person becomes a "point of failure" person. This notion of "point of failure" person must be extended to cases where not every defining PII record is a "point of failure" record. The removal of those records will prevent a search from finding that person in the reference entity resolution data graph even though the person may still exist in the data graph. This component of the evolutionary analysis framework computes the magnitude of all of these stated differences.

The next component of the evolutionary analysis process 40 splits the computed data into two sets. The first (and primary) set is the differences that include at least one person who is most sought after in the business context of the implementation of the invention (referred to herein as "active" persons). The second category is all others (referred to herein as "inactive" persons). The notion of "active" is often primarily based on the residual logs of the subject entity resolution data graph's match service which provides information about what person was returned from the match service and the specific PII record that produced the actual match. Although the input is not logged, this information gives a clear signal as to what PII in the data graph is responsible for each successful match. There are different perspectives of a definition of an "active" person, and in many contexts there is a desire to have a sequence of definitions that measures different degrees or types of activeness. The invention allows for any such user-defined sequence that uses data available to the system. However, at least one of the chosen definitions to be used involves a temporal interpretation of the clients' use of the resolution system's match service.

To compute the set of active persons, a most recent temporal window is constructed with width at least six months in certain embodiments. This width is computed based on the historical use patterns of the subject entity representation data graph. In other words, if the match service is commonly used monthly and quarterly, then a six-month window will generate a very representative signal of usage. Otherwise a larger window (usually twelve months) may be used. Using the temporal signal of match logged values, a count of the number of job units per user may be obtained. A job unit is either a single batch job from a single user or the set of transactional match calls by a common user that are temporally dense (i.e., those that appear within a well-defined start time and end time). A single PII record can be "hit" by the match service multiple times within a job unit, and this can cause the interpretation of the counts to be artificially skewed. Hence for each job unit for each user a "hit" PII record will be counted only once. In implementations where the notion of "active" is defined in different ways for different system users (i.e., financial institutions vs retail businesses), the resulting signal is decomposed into the corresponding number of sub-signals.

For each sub-signal, one interpretation of "active" persons is represented in terms of several patterns of the temporal signal from the match service results log. These patterns can include, but are not limited to, the relative recency of a large proportion of the non-zero counts, whether the signal is increasing or decreasing from the farthest past time to the present, and the amount of fluctuation from month to month (i.e., first order differences). For example, when a person makes a change in postal address or telephone number, these changes are almost never propagated to all of his or her financial and retail accounts at the same time. Often it takes months (if ever) for the change to get to all of those accounts. In these cases, this new PII will slowly begin to be seen in the signal with very small counts; but as time goes by, this signal will exhibit a pattern of increasing counts. The magnitude of the counts can be ignored as it is this increasing counts behavior clearly indicates that this new PII is important to the users of the resolution system. Similarly, some users may purchase "prospecting" files of potential new customers, and those are often run though the system's match service to see if any of the persons in the file are already customers. As such prospecting files are not run at a steady cadence, these instances can be identified in the signal by multiple fluctuations whose differences are of a much greater magnitude than the usual and expected perturbations. This type of signal may not indicate known user interest and hence often are not considered as "active" persons in this processing.

Once the active persons are identified, the previously computed data set differences are separated into those that involve at least one active person and those that contain no active person. The evolutionary impact of the differences within this latter set has significantly less probability of changing the subject entity resolution data graph in a way that would impact system performance. The output of this component is the counts of each noted type of difference, and for each two or more counts are presented. An exemplary result of a removal of a single data source from the sandbox data set may be as follows: [5404267, [2571398, 306, 15], [3799, 311, 151], [190771, 23105, 20310], [209069, 19, 2]]. The first value indicates that there were a total of 5.4 M PII records removed as they were contributed only by this one source. The next three-tuple represents the differences in terms of persons losing some but not all of their PII records. The first value (2.57 M) indicates the total number of persons in the sandbox data set for which this occurred. The next two values represent the counts for two different definitions of "active" persons, the first less restrictive than the second. Continuing, the next 3-tuple represents the same kind of counts for those persons who lost all of their PII records, followed by the 3-tuple for those persons who split into two or more persons, and finally the 3-tuple for those persons who were consolidated with another person. It should be noted that the effect of consolidation seems odd when data is removed, and this case is often overlooked. But a PII record for a person can be the critical one that separates two or more strongly related subsets of PII records, and its removal loses enough context to continue to split the subsets.

These steps of the evolutionary analysis framework interpret a single set of source data sets as a unit and independently from other sets of interest. The machine can infer some relationships between multiple sets of source files by purposely sequencing the sets and analyzing the different permutations of iteratively passing the same sets through the described process. Quite often the use context starts with a (large) set of source data and the question to answer is what subset of the full set is a "good" subset to either add to or remove from the reference entity resolution data graph that enhances and/or minimizes the negative impact on the resulting resolution. From this larger perspective rather than the direct impact on the person formations, the intent is to determine impact on the resolution capabilities for each person in terms of the presented touchpoint instances that define the person, i.e. postal addresses, email addresses, and phone numbers. A person may have multiple PII records that are contributed by many data sources, but if there are no specific touchpoint type instances (no phone numbers, no emails, etc.) then the capability of users of the resolution system to access that person through the match service using that touchpoint type.

The next component of the evolutionary analysis process 40 addresses the issue of the "point of failure" not in terms of the specific PII records but rather in terms of minimal subsets of source files whose removal will remove all of a specified touchpoint type instances for a person. The following will use email addresses to describe the process, but is also applied to other touchpoint types such as phone numbers, postal addresses, IP addresses, etc. A source file (rather than a person in the data graph) is a "point of failure" if the removal of all of the PII records for which this file is the only contributor from the data graph creates a person who had email addresses prior to the removal but has no email addresses after the removal. The removal of a source file often removes some email addresses for persons, and the removal of such email addresses are not necessarily detrimental to either the evolution of the data graph or the present state of the users' experience with the match service. In fact, historically, early provided email addresses contained a large amount of "generated" or placeholder email addresses that no user has ever employed as PII. The removal of such email addresses can cause a significant improvement in the person formations in the data graph. However, the removal of all of the email addresses for a person has a much higher probability of a negative impact on the graph and users' experience with the match service from the subject entity resolution data graph.

The notion of data source "point of failure" extends to not only a single source file but subsets of source files. Hence the machine may compute the number of persons in the input data graph that lose all of their email addresses. The input into this component is the input graph as defined above and the set of data sets whose PII records are to be considered for potential removal from the data graph. Each element of the set of data sets can be either a single data source or a set of data sources (either all stay in the graph or all must be removed, hence treated as one). Both the user and evolutionary impact of any loss of information should be considered relative to the notion of "active" persons defined earlier. The machine in certain embodiments allows for any sequence of definitions of degrees of "activeness".

The input to this component is the set of touchpoint types to be considered in the analysis, the sequence of definitions of "active" persons, and the set of source files considered for potential removal from the subject entity resolution data graph. For each input touchpoint type, and for each combination of subsets and sources, the input will be the counts of persons in the input data graph that lost all of their input touchpoint type instances due to the removal of the combination but not to any smaller subset of the combination are computed for all persons as well as for those persons included in each of the input definitions of "active" persons. In addition, the inputs will include the possible output result data formats including grouping based on all combinations containing a single source file entry in the input as well as sorted lists based on the counts.

The results from the two major components ("person" based differences and "source" based differences) provide a multi-dimensional expressive view of the major areas of impact for proposed changes in the basic data that forms the subject entity resolution data graph. Often, very narrow views drive such proposals such as an increase in the number of email and other digital touchpoints for greater coverage relative to the match service. However, each expected improvement comes at a cost in terms of some degree of negative impact. The decisions to make such changes have greatly varied parameters and contexts that define the notion of overall value and improvement. Hence the machine is further configured to provide an expressive summary of these two important dimensions.

Once the candidate sets of independent system data files for use as the "peer" set are computed, the evolutionary analysis process 40 provides the appropriate subsets of the independent systems to be considered, describing the coverage, overlap, inter-dependencies, and "points of failures" relative to both person entities and touchpoint type instances. As already noted, this appears in the form of the combination change reports 42 for each such combination. In this case the sandbox is constructed from the existing set of independent systems. Then, each existing independent system that is a potential candidate will be added to each ordered sequential list for the evolutionary analysis with a label of "remove" and the new candidates will be added with a label of "insert." As the evolutionary process for each ordered sequence is performed, the "insert" candidates will be added to the existing sandbox and the "remove" candidates will be removed from the sandbox. From this information and the restrictions, an optimally expressive set of independent systems is chosen.

Figure 6:
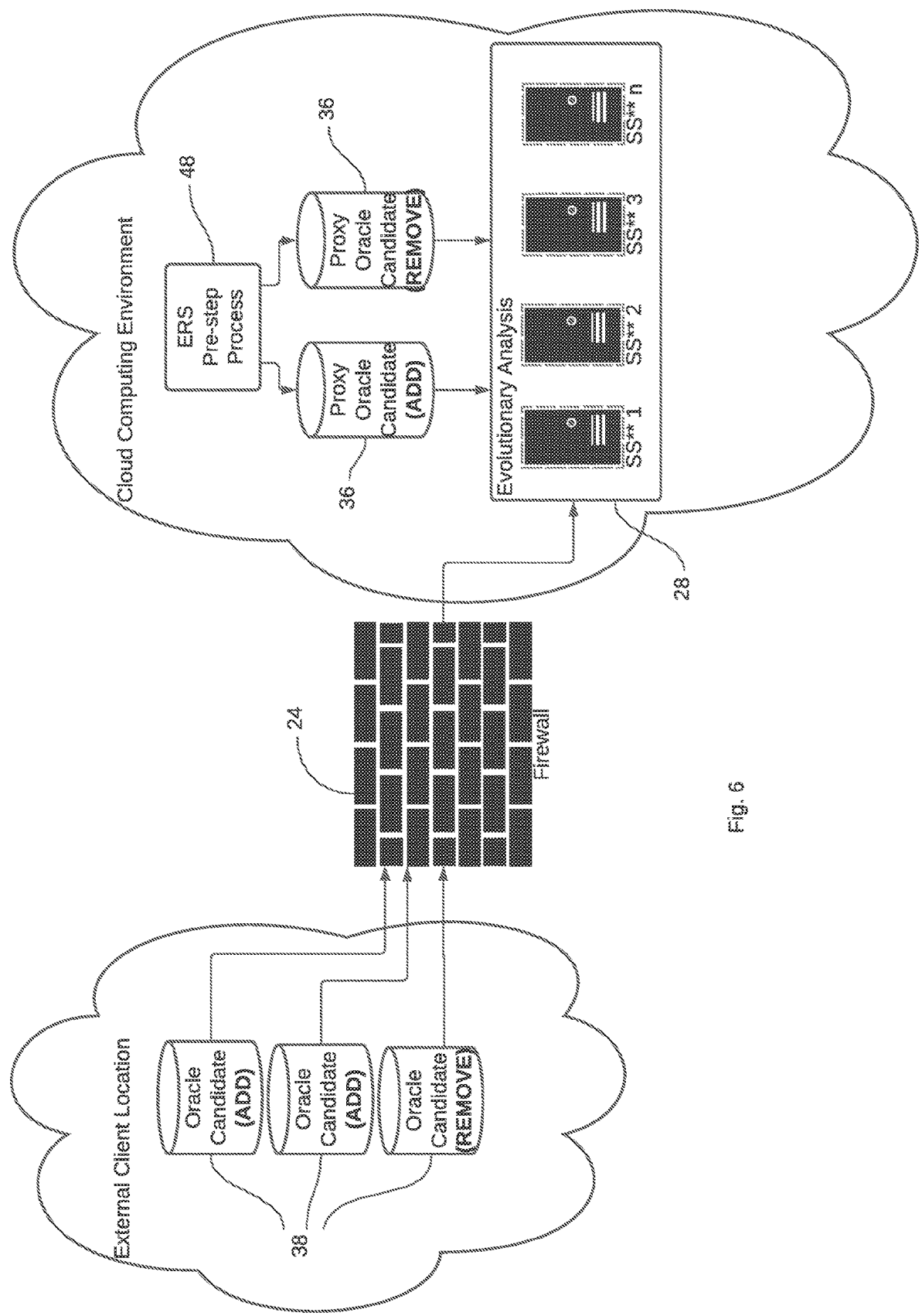
FIG. 6 is an illustration of the logical architecture of a machine to perform the peer selection step for file-based peer data structures according to an embodiment of the invention.

Hardware components to implement this process are illustrated at FIG. 6. Candidate systems 38 reside at the external client location and interact with the system through firewall 24, as described with respect to FIG. 3. In the cloud computing environment for the system, the entity resolution pre-step process, which is illustrated in more detail in FIG. 4, results in proxy candidates 36. These are then directed to historical evolutionary analysis system 28, as shown in FIG. 3. As noted above, the compute environment for this system is a Spark system using 10s to 100s of servers, each with 8 to 64 individual processors and 100s of GB of RAM.

Figure 7:
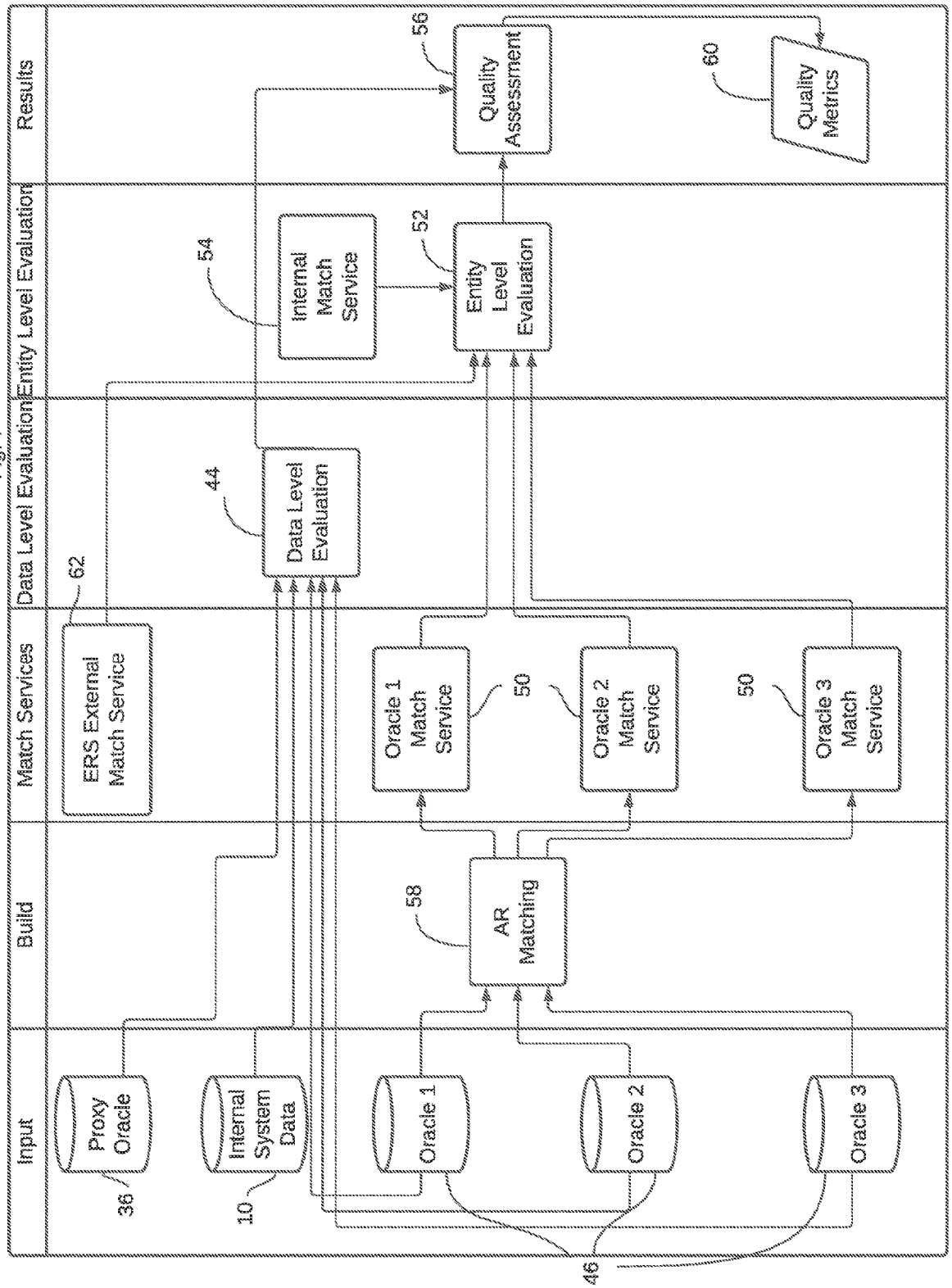
FIG. 7 is a swim lane chart illustrating the subject analysis step according to an embodiment of the present invention.

Referring now to FIG. 7, a process for performing the third major step of the process implemented by the machine may be described. Each independent system must have a "match service" interface independent of the subject entity resolution data graph. Each match service 50 allows AR input from the subject entity resolution data graph through updated candidates 46 and by way of AR matching 58 and returns one or more persons and households. In order to measure the second item of the list the match service must be capable of returning all of the person identifiers in the independent system that are the top matches for the input. For the other three categories having a single return value for the person ID is sufficient for assessment, although multiple return values can add additional insight into each of those cases.

For each of the file-based data structures a match service 50 is constructed. Such a match service is a general, full-input context one, and no specific "business rules" are added to bias the results in pre-defined ways (preference of postal addresses over phones and emails, etc.). This implementation also returns a partially ordered ranked set of match results for each AR input. For the entity resolution data graph independent systems, if one is capable of returning only one person for each full AR input, then that independent system does not contribute to the second item interpretation.

As each FB independent system asserting household information has a household identifier, these values are carried through into the implemented match service and appended for each returned person identifier. Those entity resolution data graph independent systems that provide household information will by default return the corresponding household identifiers for any input AR from the entity resolution data graph.

The set (or sets) of ARs from the entity resolution data graph to be passed to each independent system's match interface are carefully curated as described in the description of the first component of the invention. As the external context focuses on clients' perceptions of the use of the entity resolution data graph relative to their data, a set of ARs from the entity resolution data graph' region of persons and ARs that make up those persons which have evidence of being of interest to the entity resolution data graph' clients in general would be most expressive to assess these quality features. Also, as the vast majority of residential moves in the US are within the same state, the chosen sets should contain a significant portion of persons from one or more states in order to measure the impact of persons moving have on the household structures. A large random sample of such "highly sought after" population may not provide sufficient expressiveness. Once the sample or samples are chosen from the entity resolution data graph being evaluated, they are passed to each independent system's match interface and the person and household results are then processed to respond to each of the individual attributes. The estimated counts for each of these perspectives are computed.

For each entity resolution data graph that was chosen as a peer, as opposed to the file-based data structures that were chosen, there will be a proxy oracle 36. Using internal system data 10, data level evaluation (i.e., source evaluation) 44 performs source evaluation as described above in reference to FIG. 2. The resulting information is also sent to quality assessment 56 so that the file-based data structures that have passed the trustworthiness evaluation may also be considered.

The total aggregate results for each specific region/context of the entity resolution data graph being evaluated, after being normalized as described above to consider significant differences of definitions of the universes and entity types for each of the two dimensions, are collected by the system and individually tabularized in a way that can then be viewed and interpreted at both an independent system level as well as each specific quality attribute level. This process occurs at entity level evaluation 52, using internal match service 54. It may be noted that, for each member of updated peer set 46, there will be a call to external match system 12 at external match service 62. As the results are profiles of the perceptions of each peer reviewer independent system, the output is analogous to traditional peer review contexts at quality assessment 56. However, the system will compute and identify those results where the entity resolution data graph counts/distributions are significantly outside the range observed by the set of peer independent systems. In the case of distributional comparisons, one or more methods such as the discrete Kolmogorov-Smirnov (KS) tests is used for this comparative effort. The overall output of the system then is quality metrics 60, which provides qualitative information concerning identified significant differences between the internal system of interest and the group of peer systems evaluated.

The AR matching process 58 may now be described in greater detail. The construction of the persons in a large resolution system requires the partitioning of the universe of the asserted data into disjoint significantly smaller subsets where each is self-contained in terms of defining the resulting persons. Each of these subsets have membership criteria based on the members' PII. The matching service framework requires that the universe of persons be partitioned into subsets of similar persons from which one or several are chosen from which the match to the input data will be chosen. However, this partitioning must be done with the intent of forming sufficiently small subsets in order for cognitively expressive methods to be used efficiently to identify the person to be matched with the input authentication string.

There are significant differences between the partitioning of the initial universe of PII authentication strings for the construction of the persons and other entities in the entity data graph and the partitioning of the persons within the constructed entity graph for use in the AR matching algorithm. First unlike many entity resolution systems, each person can have many PII authentication strings that share little common overlap and hence the number of different name variations, postal addresses, phone numbers, email addresses and other PII information such as social security numbers, as these authentication strings come from a wide range of sources and contexts that many persons may choose to represent themselves quite differently. Although the PII authentication strings used to construct persons almost exclusively come from a common subset of the initial partitioning, persons who are strongly similar to each other can come from different partition subsets. A second difference is that multiple persons can and in fact do share large amounts of PII data across the different attribute fields. For example, two different persons can share a significant subset of attributes such as name, postal address, phone number, date of birth, email address and social security number within their defining set. As noted earlier, people often use relatives', friends', or purely bogus instances of PII attributes for different contexts from which source vendors collect and aggregate their data. Also, it is also not uncommon for a person to have tens of each of different name variations, postal addresses, phones, etc. Unfortunately, persons do not necessarily use the same touchpoint type instances for all (or even most) of their "actively used" authentication strings. Therefore, the initial partitioning necessary for matching at a full AR or person level is based on the same partitioning context used in the construction of the persons in the building of the entity graph, but uses the formed persons as the basic contextual unit for similarity measures. To get partition elements roughly the same size and as "similarity closed" as possible with a reasonable person size for each, an emphasis is placed on each person's chosen most recent/"best" postal address in the process.

The actual construction of the partition starts with the initial aggregation of persons sharing a "best" postal address for and then expands uses other fields that provide a general "locality" context such as the postal city, state, and ZIP code from the (multiple) postal addresses, area codes from the provided phone numbers, local parts of email addresses, and name components to form a similarity partition of potentially large subsets based on strict similarity criteria. For those resulting sets that are large in terms of persons and/or authentication strings that make up the persons one or more additional iterations of the partitioning steps are run on them with a tightened locality context. This tightened context is a combination of restricted base locality (i.e. area code/exchange code, postal city/state/ZIP, etc.) as well as increasing the similarity requirements such as exact matches on sufficiently large subsets of attribute fields for the persons' defining PII. When the iterations have converged to a single partitioning of the universe of persons, a feedback loop is then performed in terms of the defining similarity indices to determine whether a small number of adjustments to the partition elements in terms of strong person similarity across the partition boundaries is needed. This is needed as each time a portion of the universe has been subdivided into two or more disjoint components, persons who appeared very similar to multiple components but placed into one can look to be a better fit in a subdivision of another component that did not initially contain them. If so, such adjustments are made to the partition. and the attribute indices for each partition element is recorded.

The next major contextual component is the matching service framework that takes in the external AR to be "matched" and then calls three consecutive support components in sequence. These three components consist of the computation of the specific partition of the full universe in which to compare the input AR, the actual comparisons and aggregation of the results, and the match decision from the aggregate comparisons that determine both the strengths of the similarities and evidence of ambiguity of the similarities and makes the final match decision.

The determination of the match partition element involves the comparison of the attributes of the input authentication string to the partitioning indices. Even with the noted ambiguity and obfuscation of the cognitive division of similar authentication strings relative to persons a single index is clearly identified as the closest match to the authentication string. However, in case there is no single best match, there are two alternatives. The first is to deterministically and persistently choose a single index. The second is to return a subset of the equally strong match indices. In one implementation of this system all of the equally strong match indices are returned, and the maximum number of such return sets was three.

The framework for the "comparisons" and "match decision" components uses the cognitive context of adding the input authentication string into each of the chosen indexed partition subsets and the person formations are recomputed within each subset. This re-computation of the persons in each subset uses a "top-down" approach which is the role of the "comparisons" component. Rather than starting from scratch to reconstruct the "new" persons in each subset, the input AR is compared to each of the existing persons, and if that AR is sufficiently similar to be added to that person by use of the same criteria used for the rich contextual full graph construction it is noted as such. In case the AR is not similar enough to be potentially combined with an existing person it is thought to be a "new" person in that partition subset.

It is not uncommon for a person to use different variations of their name components in different orderings. Also, it is very common to find "first" and "middle" initials used. Similarly, it is not uncommon for persons to use one or more nicknames and name variants. Attempts to standardize and/or hygiene these names fail and often bring additional ambiguity as there is extremely limited context when the interpretation is based solely on the name components of each AR independently. Similarly, postal addresses are also not assumed to be in a "correct" or anticipated format as well so that a direct comparison of such strings cannot be applied. Next, when persons obfuscate a presented phone number it is primarily not just a random choice of digits, but rather replacing one or more of the area code, exchange code, and line number with a slightly altered or clearly bogus one, i.e. line number 0000, 9999, a special use or unused area code, directory assistance (555-1212), etc. The phone obfuscation also occurs by submitting a phone number of another person in the same household or relative/friend as well as a business number. If any of these first stated cases is identified for a phone number within a comparison between the input AR and one of the ARs defining a considered person, the degree of similarity of the ARs is not penalized by the phone comparison, but is logically considered to be a "blank" value. On the other hand, if it is determined that the phone number is associated with a different AR or person that shares the household containing the input AR the phone number acts as a complete phone match in the comparison. All other cases fall into the category of determining the different similarities and types of differences of the three phone components (area code, exchange code, and line number). For example, if the phone numbers share an area code and exchange code and the line number differs by a single digit or a switch of two consecutive digits then the similarity is quite strong. Similarly, if the exchange code and line number are the same and are not as noted above (clearly non-useful or invalid numbers) and the area code is different, the number are considered similar as it is not uncommon for persons moving to another location or needing a new phone number for a specific purpose to use the same non-area code 7 digits. Also, sometimes asserted phone numbers have some of the last digits replaced by "X" (often the line number or the last 2 digits of the line number). In these cases, the two phone numbers are considered similar enough to provide support for the similarity of the AR to persons comparisons.

Continuing, if age and/or year of birth is provided, a difference of no more than four years signal a useful degree of evidence of AR similarity is marked (the smaller the difference the stronger the evidence). If a full date of birth is provided in each AR being compared, the month/year portion of the dob carries the bulk of evidence for similarity. It is a common practice to obfuscate one's actual birth day by using the first of the month and also using January 1 as the month/day. For the instances of the latter case only the year is used or each of the month/day assertion of the ARs being compared is this common date (Jan 1) as it is the case that the January 1 variation is the most frequent for those who obfuscate their date of births this way.

If social security numbers and/or email addresses are provided, these can add evidence depending on the strength and type of the similarity of the above noted PII components. For example, if there is an exact match of these attributes this contributes to the similarity evidence in a very strong way (provided the social security number is not an obvious bogus one (123-45-6789, 999-99-9999, etc.) or the email address is not an obvious bogus one (noname@noname.com) or a very common first or last name and a very common email domain (smith@gmail.com). However, these "common components" email addresses are used as obfuscated ones quite regularly and close relatives (parents, grandparents, children) sometimes share one or more of their social security numbers in different socioeconomic situations/transactions.

No similarity scoring mechanism is used to determine the final degree of similarity between the input AR and the person ARs being compared as the believability of the similarity of the AR and the person does not depend on the independent individual component similarity only but rather also on the specific fields that show the greatest similarity strength as well as the use case preference of the entity resolution system. In particular, a mother and daughter can share a common full name, postal address, phone number, email address, and have ages differing by 15+ years. On the other hand, if there is a common name, phone number, email address, social security number/age but a different postal address in the same state associated with the area code of the common phone number, then a much stronger claim can be made that the input AR is the same person being compared. Therefore, the decision as to whether the similarity is strong enough to combine the input AR with the compared person depends on context that is not captured by independent single attribute similarities.

Entity resolutions are of two general types, namely those that prefer "under-consolidations" and those that prefer "over-consolidations" in terms of the acceptable false positive and false negative ratios. However, in either of these cases it is sometimes important to initially "match" input ARs that do not completely align with those in the resolution system in the other context. When the entity resolution system is internally assessed in terms of potentially adding and/or removing a set of sources to the construction of the system, a significant component of this assessment is done by evaluating the evolutionary change to the system through means of using the match service. In these cases, there needs to be consistency in the balance between the construction of the data graph and this match process. On the other hand, this system allows for such adjustments to be made by changing the types of cases noted above to describe the desired contexts for strong matching criteria.

Finally, if none of the compared person's AR strongly matches the input AR, the above process is applied to the set of all touchpoint types and attributes provided by all of that person's AR to find a potentially strong similarity. Since finding a strong similarity between the input AR and a single externally asserted AR is cognitively more defensible than a strong similarity by an aggregate view, the if there is not an extremely strong similarity comparison at a single AR level, both the best single AR match (if one occurs) context and the best aggregate similarity match context are collected to pass on the "match decision" component.

As the addition of a single AR to a set of strongly similar persons often has greater impact than just a simple addition of the AR to a single person, the match decision component considers all defensible single additions of the AR to appropriate persons and measures this larger context to identify newly created ambiguities or significant implied changes to the existing graph structure. As the match service's jurisdiction does not extend to direct changes to the graph itself, but rather a best answer based on "if" the AR was to be added to the graph the match decision must respond with a reply that is consistent and meaningful with the existing state of the graph. Also, this invention allows for the client using the match service to designate specific business rules that can impact both preferences in terms of emphasis on one or more different touchpoint types and the maximum number of persons to be returned in the decision process. These business rules only apply to the persons already identified to be similar enough to the input AR to be consumed by them. Such rules can include if the similarity level favors name and email exactness over postal and phone, requires an exact match to the input phone number, requires an AR to AR match, and a maximum of 5 persons will be accepted for each input AR. If no such rules are provided, then at most a single person will be returned on the basis of the similarity profiles for each person given to the match decision component.

Moving to the actual decision process, if the AR was not added to any person in the partition subsets, then the AR is contextually a "new person" and this sub-component would respond with the decision that there is no person in the entity graph that the AR "matches". On the other hand, if there is only one person which consumed the input AR into itself, then this person is the unique match decision and will be returned as the match decision as long as it meets the specific business rules provided.

[When the input AR has been consumed within two or more persons that satisfy the client's business rules, if there is only one person that has an AR to AR strong match with the input, that is the person that is returned by this component. However, if there are more than the maximum number of allowed persons to include in the result, then there is a level of ambiguity that can be addressed in several ways.

If the input AR consists of a single touchpoint type instance (name, postal address, phone number, or email address) the input has very low granularity in that there is a very high probability that there will be multiple persons who share this instance. This will be true for any entity resolution system. In this case, if the clients wish to receive the identifier for a single person (or other entity such as a household) in order to preserve as much persistency/consistency as possible in an evolutionary system a single "best" person is pre-decided and indexed for each touchpoint type instance in the data graph. This invention follows this known paradigm as well for this case.

When the input AR consists of two touchpoint instances (primarily an asserted name and one other touchpoint type instance) the probability of multiple persons sharing this information does drop but is still quite high (as noted at the start of this document). Again, entity resolution systems in general approach this issue in the same way as the single touchpoint type instance case, and this invention also uses this approach as well, and in fact moves it up to the case of an asserted name and two additional touchpoint type instances.

Continuing, to choose a "best" person and index the results for more than three touchpoint instances becomes exponentially greater to the point of a significant negative impact on the efficiency of both the construction of the data graph directly used by the match service as well as the lookup process during the decision making of the person to return. Most (if not all) of the entity resolution systems used primarily for marketing efforts address this issue by restricting the lens of the match service to only consider the "name+one different touchpoint type instance" or "name+two distinct touchpoint type instances" cases and use the indexing of a "best" person. However, for such entity resolutions this creates a major contextual problem. We describe this issue with an example.

Consider the input JOHN SMITH, 235 N 23rd ST, NEW YORK NY 01234, 543-443-2100, JSMITH@GMAIL.COM. Using a name+single touchpoint type instance "lens" the match service discovers that there are twelve persons with the same name and postal address, so it uses the indexed "best" choice of person X. Similarly, there are four persons in the data graph that share the same name and phone number and thirty persons that share the same name and email address. The match service chooses person Y (different from X) for the name+phone match result and person Z for the name+email address match result. However, there is only one person in the entity data graph that matches the full input AR, in particular person W. Person W was in each of the sets of candidates for the three match decisions but was never chosen. Even if business specific rules are added to pick a "best" cumulative result from X, Y, and Z the actual defensible best decision would not be found. As noted in the introductory narrative, these types of cases occur more frequently than expected due to the nature of the universe of the available authentication strings available for marketing purposes and the wide range of ARs that people use in different socio-economic contexts.

In order to address these larger contextual ARs (name plus three or more touchpoint type instances) the steps begin as in the previous cases, first the candidates are filtered in terms of the client's business rules and the number of persons whose similarity profile indicates an AR to AR match is identified. In case there are fewer candidates than the maximum number of acceptable persons in the business rules, then the result is straightforward. When there are more candidates than the maximum number of acceptable persons in the returned result the candidates are then attempted to be ordered in such a way that there is a clear distinction between a subset of the candidates that are the strongest and whose size does not exceed the business specific requirements.

The ordering noted above is a partial ordering rather than a strict ordering. A strict ordering is one where the "first place" entity is (strictly) better than the "second place" entity, and so forth. However, for similarity measurement in these types of resolution systems there is no defensible strict ordering as there can be multiple persons whose similarity to the input AR are different in nature but equal in strength. Hence the partial ordering scheme of the "first place" entity is not less than the "second place" entity, etc. can be defensibly and consistently. As a simple example the partial ordering of the following arithmetic expressions based on their numerical result is "3+3", "3*2", "30/5", "4", "3+1", "10/5".

Hence the goal of the match decision component is to find such a partial ordering of the candidate persons so that there is a clear strict delineation in the partial order (a strict "better" step between two consecutive entries) so that the head of the list does not exceed the maximum allowed number of persons to be returned. In the vast majority of the cases the straightforward review of the profiles of the candidate persons has such a clear delineation as noted and the return value is quickly determined. This ordering considers the client's specific similarities preferences.

The similarity ambiguity for input ARs with this many touchpoint type instances to form the context for comparisons decreases exponentially to exceedingly low probabilities, and hence the number of cases where there are "too many" indistinguishable similarity persons is very rare. But in those cases, this invention also has the similarity component return the number of different touchpoint type and attribute instances found in all of the ARs that make up the person. These values are then used to measure the degree of expected obfuscation for each person. For example, a person with multiple asserted date of births and/or social security numbers, many phone numbers and/or email addresses, etc., is assumed to be a less defensible candidate for a meaningful return value than a person without such evidence of personal obfuscation.

Finally, if after this last filtering effort there are still too many persons in the smallest distinguishable set of "best" persons, several implementations are available. One implementation would return no person result, and a special identifier that separates this case from the "no match" result. Another implementation can be to return the best persons if their number exceeds the maximum allowable by a small amount, again clearly marking the results to identify this case. Yet another is to (randomly) choose an allowable number of persons to return. But in this case, if consistency or persistency is a valued trait of the match service the returned set needs to be indexed for that specific client so that future calls to the match service can preserve this trait.

Moving to other steps in the process, data level evaluation 44 and entity level evaluation 52 may now be described in greater detail. Processing here begins by the computation of the distributions and counts for each independent system that forms the basis for the analysis process for the system to be evaluated. In one implementation, the independent system data update period is a month. However, this time frame can in fact be different for the different independent systems. The set of such counts and distributions are computed at the beginning of the independent system's update "month" and may be designed to be sufficiently general yet expressive in order to be used to respond not only to present single analysis queries but rather to (existing and new) sets of related queries in an efficient manner. An example of this type of distribution will be discussed below.

The quality dimensions that are assessed via each appropriate independent system in this invention for the subject entity resolution data graph are from both internal and external perspectives. The internal dimensions include the same as is used to assess the candidate independent systems and include the following: the believability and consistency of each AR at both an individual and aggregate level; the temporal changes in touchpoint type instances; the distributions of the number of entities having different ranges of attribute values (number of persons "living" in each state, gender distribution, age distribution, etc.); and the temporal persistency of person and household entities (when and how changes occur in such entities). To assess this internal aspect of the entity resolution data graph, a large subset of the perspectives from the distributions used to determine similar quality analysis for the candidate independent systems are computed for the entity resolution data graph. But because the different independent systems as well as the entity resolution data graph being evaluated can contain any number of different touchpoint type instances (names, postal addresses, phone numbers, emails, etc.) for a person, multiple levels of quality comparisons may be used. Yet in these cases the system and data flow for the computations of the distributions from which the entity resolution data graph will be compared with the set of independent systems is the same as that described in the first component. For example, consider the case that a person in one of the independent systems or entity resolution data graphs being evaluated has four asserted postal addresses and five phone numbers. One implementation of this invention computes anonymous keys for the distribution of the relationship patterns per person. In this case a key for the postal state/phone number consistency distribution is a tuple of the form (postal phone state agreements, non-related phone info). The "postal state agreements" portion of the key is a tuple of values for each state in the postal addresses, whereas the non-related phone info is a list of tuples that represent phone numbers not related to any asserted state.

To compute the tuple for "postal state agreements," for each independent system each distinct state is represented by the count of distinct phone numbers whose area codes are associated with that state. For example the tuple (2,1,0) indicates that of the four asserted postal addresses there are three distinct states, two of the phone numbers are associated with one of the states, another phone number is associated with a second state, and one state has no associated asserted phone number. If this information came from the entity resolution data graph being evaluated, each of the values would be replaced with a tuple. This tuple indicates for each state whether it is one that the entity resolution data graph' clients are using when matching/linking to a customer (binary value), whether the state is the one that is used in the best postal address for the person (binary value), the number of phone numbers associated with the state, the number of phone numbers the entity resolution data graph' clients are using when matching/linking to a customer, and whether one of the phone numbers is considered by the entity resolution data graph to be the best phone number for the person (binary value). So the tuple (2,1,0) can extend to the tuple ((1,0,2,1,0), (1,1,1,0,0), (0,0,0,0,0)). In this case the first state (1,0,2,1,0) is one used by the clients when matching, is not the state for the best postal address, has two distinct phone numbers associated with the state, one of the phone numbers appears to be used by the entity resolution data graph' clients when matching and is not the best phone number for the person. So this key not only expresses the same general information that the independent system-based key provides, but also provides a snapshot into the state of important information relative to external and internal contexts.

The "non-related phone information" portion of the key describes the counts of the phone numbers that are not associated with any of the distinct states. This is a tuple of the form (#phone numbers associated with different states, #phone numbers with a special use area code, #phone numbers with a "not presently in use" area code). So for the example described, there are two phone numbers not associated with the asserted postal states and the tuple for them may be (0,2,0) which indicates each are special use phone numbers. In this case the full key for the postal/phone state consistency distribution would be ((2,1,0),(0,2,0)). For the entity resolution data graph being evaluated, this key is extended in like manner as described above, providing internal and external context for the existing use cases of the phone numbers. In general, all of the quality attributes used in this invention can also be expressed in a similar fashion. In case there is one region of the graph that is desired to be assessed, for example all persons who reside in South Carolina, the distribution keys can add an additional binary flag indicating whether or not the associated person/AR meets that specific criterion.

This type of construction allows for the level of precision and contextual use to be adjusted without the construction of additional sets of distribution data. For example, relative to the postal state/phone consistency quality attribute the level of precision for assessment can be set very coarsely by determining whether at least one (of multiple) postal address and phone number share a common associated state. On the other extreme, the assessment can be made as to whether the majority (or other percentage) of the postal addresses and phone numbers share a common set of states. Likewise, independent of the precision the assessment of the entity resolution data graph can include only those persons and touchpoint type instances that are important to internal and/or external use cases. Although this type of filtering can be done at the start of the process relative to defining which region of the entity resolution data graph is to be evaluated, the capability to assess any set of particular quality aspects on different scales and contexts independent of the region chosen adds significant flexibility and expressiveness to the assessment at a very minimal computational and efficiency cost.

The "external" perspective of quality assessment is focused on the experience that the clients of the entity resolution data graph have when using the entity resolution data graph matching/linking service interface. The categories of quality for that experience that are addressed from the perspective of the independent systems, acting as proxies for the clients, are: (1) the number of different persons from the perspective of the independent system that are viewed as the same person in the entity resolution data graph (over-consolidations from the independent system's perspective) as well as the magnitude of the sizes of each such case; (2) the number of single persons from the perspective of the independent system that are viewed as multiple persons in the entity resolution data graph (under-consolidations from the independent system's perspective) as well as the magnitude of the sizes of each such case; (3) the number of different households from the perspective of the independent system that intersect a single household from the perspective of the entity resolution data graph as well as the magnitude of the sizes of each such case, and (4) the number of single households from the perspective of the independent system that intersect multiple households from the perspective of the entity resolution data graph as well as the magnitude of the sizes of each such case.

Also of interest is high "coverage" of entity data in the entity resolution data graph. This aspect is not covered, however, in the actual assessment for two fundamental reasons. First, the only way to measure this coverage efficiently and defensibly is by passing the data into the entity resolution data graph's match service and measuring this coverage from the results, which is exactly the process that external users employ when using the entity resolution data graph. Second, this coverage is directly dependent on the features (and biases) of the entity resolution data graph's match service. As this invention is measuring the quality of the data graph model rather than the interface, which often does not use the same context as that used in the evolution of the data graph, this measurement is outside the scope of this invention. Therefore, for this portion of the assessment, once the different regions/contexts of the graph are desired to be assessed for the chosen time period, only one general set of distributions will be constructed in a fashion similar to that described in the first component with counts and distribution keys reflecting the different attributes of the persons/ARs that define the different perspectives for each of the independent systems and the entity resolution data graph being evaluated.

Figure 8:
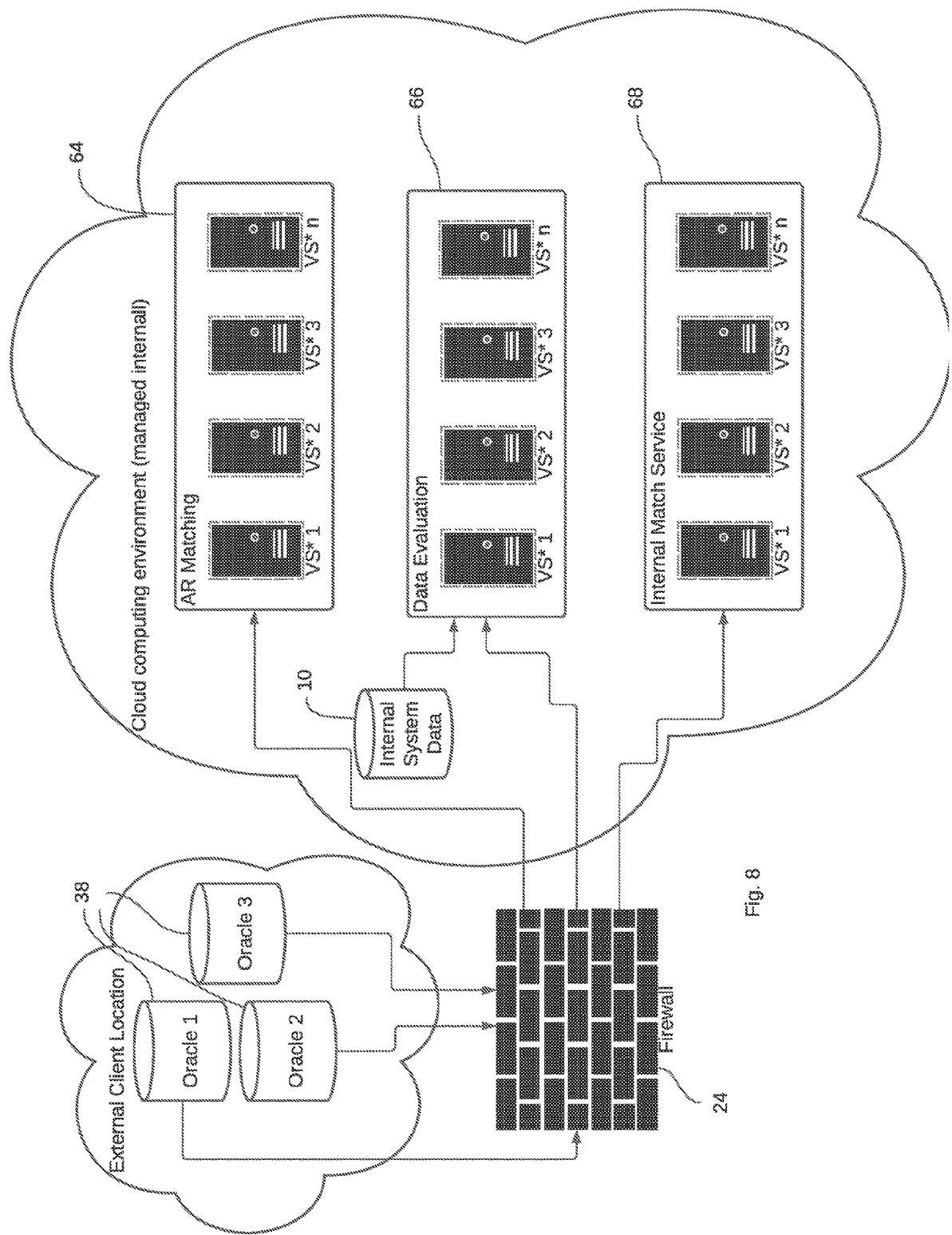
FIG. 8 is an illustration of the logical architecture of a machine to perform the subject analysis step according to an embodiment of the present invention.

FIG. 8 provides a hardware overview of components for implementation of this third main step of the process. Candidate systems 38 are located at the external client location, remote from the processing system, and interact with the system through firewall 24. Similar to cloud computing environments described previously, there are environments here for AR matching process 58, data-level evaluation process 44, and internal match service process 54.

The machine described herein may in various embodiments be implemented by any combination of hardware and software. For example, in one embodiment, the machine may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

The machine as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the machine may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various sub-systems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A machine for analyzing a subject entity resolution data graph against peer data structures, the subject entity resolution data graph comprising a plurality of asserted relationships, each asserted relationship comprising a set of entity data for a particular entity and connections between the entity data, the machine comprising:
    at least one processor; and
    at least one memory that stores executable instructions that, when executed by the at least one processor, facilitates performance of operations, the operations comprising:
    screening a plurality of peer entity resolution data structures to produce a set of trustworthiness metrics, wherein the set of trustworthiness metrics are applied to produce a plurality of candidate data structures, wherein the plurality of candidate data structures form a subset of the plurality of peer entity resolution data structures;
    creating combinations of each one of the plurality of candidate data structures with each other one of the plurality of candidate data structures and submitting each combination to an evolutionary analysis process to produce a plurality of oracles, wherein the plurality of oracles form a subset of the plurality of candidate data structures; and
    deriving asserted relationships from each of the plurality of candidate data structures, matching those candidate data structure asserted relationships against the subject entity resolution data graph to produce a set of matching results by partitioning the subject entity resolution data graph into disjoint significantly smaller subsets, wherein each subset is self-contained, and wherein the partitioning starts with aggregation of entities sharing a best postal address, then expands to fields providing a general locality index, and wherein when the partitioning converges a feedback loop is performed in terms of a set of defining similarity indices to determine whether a small number of adjustments to partition elements is needed, and then performing data-level and entity-level evaluation against the set of matching results to produce a set of quality metrics for the subject entity resolution data graph.

2. The machine of claim 1, wherein at least one of the plurality of peer entity resolution data structures is a file-based data structure.

3. The machine of claim 2, wherein at least one of the plurality of entity data structures is an independent entity resolution data system.

4. The machine of claim 3, wherein the stored executable instructions further facilitate creating an internal system data set from the at least one independent entity resolution data system.

5. The machine of claim 4, wherein the at least one file-based data structure further comprises a plurality of historical versions of the at least one file-based data structure.

6. The machine of claim 5, wherein trustworthiness metrics comprise source evaluation metrics, match metrics, and evolutionary metrics.

7. The machine of claim 6, wherein the match metrics are created by performing a linking process against the subject entity resolution data graph using the at least one file-based data structure.

8. The machine of claim 7, wherein the evolutionary metrics are created by measuring a degree to which the at least one file-based data structure changes over time with respect to the plurality of historical versions of the at least one file-based data structure.

9. The machine of claim 4, wherein the stored executable instructions further facilitate applying at least one external entity resolution data graph to a subset of the internal system data set to generate a set of match results to produce a proxy file-based data structure.

10. The machine of claim 9, wherein at least one of the created combinations is the proxy file-based data structure combined with the at least one file-based data structure.

11. The machine of claim 10, wherein the stored executable instructions further facilitate calling an external match service for entity-level evaluation against the proxy file-based data structure.

12. The machine of claim 4, wherein each of the plurality of peer entity resolution data structures comprise more localized and specific entity data than the subject entity resolution data graph.

13. The machine of claim 12, wherein each of the plurality of peer entity resolution data structures is independent from each of the others of the plurality of peer entity resolution data structures.

14. The machine of claim 13, wherein the subject entity resolution data graph comprises a plurality of asserted relationships representing a full universe of entities, and further where each of the plurality of peer entity resolution data structures comprise a subset of the plurality of asserted relationships representing a full universe of entities.

15. The machine of claim 3, wherein the independent entity resolution data system is not shareable.

16. The machine of claim 15, wherein the independent entity resolution data system comprises a linking service.

17. A machine for evaluation a subject entity resolution data graph, the machine comprising:
    a subject entity resolution data graph, wherein the subject entity resolution data graph comprises a plurality of asserted relationships, wherein each of the plurality of asserted relationships comprise at least one touchpoint and at least one identifier, and further wherein the subject entity resolution data graph comprises a linking service configured to receive a touchpoint and return an identifier;

a plurality of peer data structures, wherein each peer data structure of the plurality of peer data structures is independent of each of the other peer data structures;

a source evaluation system configured to read a set of asserted relationships from the peer data structures and produce a set of source evaluation metrics indicative of consistency of the set of asserted relationships from the peer data structure;

a linking evaluation system configured to read a set of asserted relationships from the peer data structure and produce a set of match metrics indicative of similarity of the peer data structure to the subject entity resolution data graph; and an asserted relationship matching system configured to, for each peer data structure that comprises a file-based data structure, creating a match service corresponding to such peer data structure by partitioning the subject entity resolution data graph into disjoint significantly smaller subsets, wherein each subset is self-contained, and wherein the partitioning starts with aggregation of entities sharing a best postal address, then expands to fields providing a general locality index, and wherein when the partitioning converges a feedback loop is performed in terms of a set of defining similarity indices to determine whether a small number of adjustments to partition elements is needed; and an evolutionary analysis system configured to read the peer data structure and at least one historical version of the peer data structure and produce a set of evolutionary metrics indicative of changes over time in the peer data structure.

18. The machine of claim 17, further comprising an entity resolution data graph pre-processing system configured to construct a proxy file-based data structure for each peer data structure that comprises an independent entity resolution data graph.

19. The machine of claim 18, further comprising a quality assessment system configured to receive a data-level evaluation and an entity-level evaluation to produce a set of quality metrics indicative of similarity between the peer data structure and the subject entity resolution data graph.

* * * * *